United States Patent
Higa et al.

(10) Patent No.: US 9,886,169 B2
(45) Date of Patent: Feb. 6, 2018

(54) MEDIA SERVICE USER INTERFACE SYSTEMS AND METHODS

(71) Applicant: Verizon Patent and Licensing Inc., Arlington, VA (US)

(72) Inventors: George M. Higa, Plano, TX (US); Deron Bauman, Dallas, TX (US); Lilian Mi Quach, Grand Prairie, TX (US); Hao Tzu Kong, Allen, TX (US); Sherrily Huang, Plano, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 340 days.

(21) Appl. No.: 14/265,031

(22) Filed: Apr. 29, 2014

(65) Prior Publication Data

US 2015/0309715 A1 Oct. 29, 2015

(51) Int. Cl.

| G06F 3/048 | (2013.01) |
|---|---|
| G06F 3/0482 | (2013.01) |
| H04N 21/422 | (2011.01) |
| H04N 21/482 | (2011.01) |
| G06F 3/0354 | (2013.01) |
| G06F 3/0489 | (2013.01) |

(52) U.S. Cl.
CPC ........ *G06F 3/0482* (2013.01); *G06F 3/03547* (2013.01); *G06F 3/04892* (2013.01); *H04N 21/42204* (2013.01); *H04N 21/482* (2013.01); *G06F 2203/04803* (2013.01)

(58) Field of Classification Search
CPC ............ H04M 1/72533; G06F 3/0482; H04N 5/4403; H04N 2005/441; H04N 2005/44586; H04N 2005/4412; H04N 2005/4408
See application file for complete search history.

(56) References Cited

U.S. PATENT DOCUMENTS

| 5,410,326 | A | * | 4/1995 | Goldstein | G08C 23/04 340/12.26 |
|---|---|---|---|---|---|
| 5,801,747 | A | * | 9/1998 | Bedard | H04H 60/33 348/E17.001 |
| 5,850,218 | A | * | 12/1998 | LaJoie | H04N 21/84 348/E5.102 |
| 6,437,836 | B1 | * | 8/2002 | Huang | G06F 1/1626 340/12.54 |
| 6,563,515 | B1 | * | 5/2003 | Reynolds | H04N 5/44543 348/E5.105 |

(Continued)

*Primary Examiner* — Ryan Pitaro

(57) ABSTRACT

In an exemplary method, a media service user interface system provides, for display on a screen of a primary display device, a media menu tray user interface view that includes a media menu tray representing a menu of one or more media programs and provides, for display on a display screen of a mobile device while the media menu tray user interface view is provided for display on the display screen of the primary display device, a remote control user interface view dynamically tailored to facilitate remote user interaction with the media menu tray included in the media menu tray user interface view provided for display on the display screen of the primary display device. In certain examples, the remote control user interface view is dynamically tailored based on a current state of the media menu tray user interface view.

21 Claims, 13 Drawing Sheets

(56) References Cited

U.S. PATENT DOCUMENTS

| | | | | |
|---|---|---|---|---|
| 6,806,887 B2* | 10/2004 | Chernock | G06F 3/0481 | 345/629 |
| 6,865,746 B1* | 3/2005 | Herrington | H04N 5/44543 | 348/E5.105 |
| 7,421,656 B2* | 9/2008 | Fong | G06F 3/0219 | 715/716 |
| 7,818,769 B2* | 10/2010 | Peacock | H04N 5/44543 | 725/50 |
| 8,020,099 B1* | 9/2011 | Lu | H04N 21/4781 | 700/88 |
| 8,199,113 B2* | 6/2012 | Madonna | G06F 3/0482 | 341/22 |
| 8,397,264 B2* | 3/2013 | Ansari | G06Q 30/04 | 725/74 |
| 8,607,268 B2* | 12/2013 | Migos | H04N 5/44543 | 348/734 |
| 8,881,205 B2* | 11/2014 | Friedman | G06F 1/1626 | 715/835 |
| 9,071,797 B2* | 6/2015 | Mukerji | H04N 5/44543 | |
| 9,329,746 B2* | 5/2016 | Lee | G06F 3/0481 | |
| 9,344,765 B2* | 5/2016 | Diaz Perez | G06Q 30/02 | |
| 2002/0099709 A1* | 7/2002 | Wallace | H04N 5/44543 | |
| 2003/0035074 A1* | 2/2003 | Dubil | H04N 5/4403 | 348/734 |
| 2003/0149978 A1* | 8/2003 | Plotnick | G06Q 10/109 | 725/39 |
| 2003/0202773 A1* | 10/2003 | Dow | G06F 17/30787 | 386/251 |
| 2004/0006746 A1* | 1/2004 | Dow | H04N 1/00384 | 715/273 |
| 2004/0189690 A1* | 9/2004 | Poslinski | G11B 27/322 | 715/719 |
| 2005/0166230 A1* | 7/2005 | Gaydou | G11B 27/034 | 725/41 |
| 2005/0240965 A1* | 10/2005 | Watson | H04N 5/44543 | 725/45 |
| 2007/0067732 A1* | 3/2007 | Kang | G06F 3/04892 | 715/767 |
| 2007/0189737 A1* | 8/2007 | Chaudhri | G06F 3/0482 | 386/234 |
| 2007/0229465 A1* | 10/2007 | Sakai | G08C 17/00 | 345/173 |
| 2008/0077852 A1* | 3/2008 | Fleishman | G06F 9/4443 | 715/234 |
| 2009/0153289 A1* | 6/2009 | Hope | G06F 3/04883 | 340/5.1 |
| 2009/0158207 A1* | 6/2009 | Nakada | G11B 19/025 | 715/810 |
| 2009/0222757 A1* | 9/2009 | Gupta | H04N 5/44543 | 715/776 |
| 2009/0304358 A1* | 12/2009 | Rashkovskiy | H04H 20/106 | 386/248 |
| 2010/0042692 A1* | 2/2010 | Irwin | G06F 8/60 | 709/206 |
| 2010/0079671 A1* | 4/2010 | Vanduyn | G06F 3/0481 | 348/565 |
| 2010/0189416 A1* | 7/2010 | Kawakami | G11B 19/047 | 386/241 |
| 2010/0222102 A1* | 9/2010 | Rodriguez | G06Q 30/02 | 455/557 |
| 2011/0007018 A1* | 1/2011 | McKinley | G08C 17/02 | 345/173 |
| 2011/0043326 A1* | 2/2011 | Lee | H04N 7/163 | 340/5.8 |
| 2011/0078731 A1* | 3/2011 | Nishimura | G06F 9/4446 | 725/39 |
| 2011/0093890 A1* | 4/2011 | Araki | H01R 13/6461 | 725/37 |
| 2011/0126237 A1* | 5/2011 | Lee | H04N 21/4312 | 725/46 |
| 2011/0231872 A1* | 9/2011 | Gharachorloo | H04N 21/4126 | 725/28 |
| 2011/0283232 A1* | 11/2011 | Jordan | H04N 5/44543 | 715/810 |
| 2011/0289419 A1* | 11/2011 | Yu | G06F 9/44526 | 715/738 |
| 2012/0005228 A1* | 1/2012 | Singh | G06F 17/30398 | 707/769 |
| 2012/0060092 A1* | 3/2012 | Hill | H04N 5/44513 | 715/716 |
| 2012/0084662 A1* | 4/2012 | Navarro | H04N 5/44543 | 715/740 |
| 2012/0109384 A1* | 5/2012 | Stepanian | G06F 21/10 | 700/275 |
| 2012/0120296 A1* | 5/2012 | Roberts | H04N 21/4126 | 348/333.12 |
| 2012/0159372 A1* | 6/2012 | Stallings | H04N 21/42208 | 715/773 |
| 2012/0290942 A1* | 11/2012 | Lim | H04M 1/7253 | 715/748 |
| 2012/0326851 A1* | 12/2012 | Xu | H04L 67/025 | 340/12.26 |
| 2013/0040623 A1* | 2/2013 | Chun | H04N 21/4126 | 455/414.2 |
| 2013/0069769 A1* | 3/2013 | Pennington | G08C 17/02 | 340/12.28 |
| 2013/0176415 A1* | 7/2013 | Kim | H04N 5/23219 | 348/78 |
| 2013/0291015 A1* | 10/2013 | Pan | H04N 5/4403 | 725/37 |
| 2014/0130099 A1* | 5/2014 | Kunisetty | H04N 21/4667 | 725/50 |
| 2014/0181749 A1* | 6/2014 | Takikawa | G06F 3/04817 | 715/835 |
| 2014/0210755 A1* | 7/2014 | Jung | G06F 3/01 | 345/173 |
| 2014/0245149 A1* | 8/2014 | Hill | G06F 3/0482 | 715/719 |
| 2014/0259074 A1* | 9/2014 | Ansari | H04N 21/482 | 725/50 |
| 2014/0282044 A1* | 9/2014 | Oztaskent | G06F 3/033 | 715/740 |
| 2014/0282746 A1* | 9/2014 | Lin | H04N 21/482 | 725/61 |
| 2014/0344721 A1* | 11/2014 | Prakash | H04M 1/274508 | 715/753 |
| 2014/0344861 A1* | 11/2014 | Berner | H04N 21/4826 | 725/46 |
| 2015/0074728 A1* | 3/2015 | Chai | H04N 21/482 | 725/61 |
| 2015/0185981 A1* | 7/2015 | Mesguich Havilio | G06F 3/0483 | 715/773 |
| 2015/0194047 A1* | 7/2015 | Lu | G08C 17/02 | 340/12.28 |
| 2015/0242068 A1* | 8/2015 | Losey | G06Q 30/02 | 715/716 |
| 2015/0312618 A1* | 10/2015 | McElhatten | H04N 5/44543 | 725/53 |
| 2015/0382066 A1* | 12/2015 | Heeter | H04N 21/47217 | 386/234 |
| 2016/0100226 A1* | 4/2016 | Sadler | H04N 21/47217 | 725/38 |
| 2017/0055016 A1* | 2/2017 | Thomas | H04N 21/2743 | |

* cited by examiner

MEDIA SERVICE USER INTERFACE SYSTEMS AND METHODS

BACKGROUND INFORMATION

A media service, such as a subscriber television service, provides end users of the service with access to media content. An end user typically interacts with the service by way of a media service user interface that allows the end user to discover and access features of the media service and/or media content that is accessible through the media service.

A common challenge for a provider of a media service has been to design and implement a media service user interface that provides an appropriate balance of information, usability, intuitiveness, personalization, and functionality that promotes a quality user experience with the media service. The challenge is exacerbated for a provider of a media service that has a robust set of features and/or provides access to various types of media content. While media service user interface technologies have made significant advances, there remains room for improvement.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary media service user interface systems and methods are described herein. The systems and methods described herein may provide one or more user interfaces through which a user may interact with a media service. In certain examples, systems and methods described herein may concurrently provide a primary user interface for display by a primary display device and a secondary user interface for display by a secondary display device. The primary and secondary user interfaces may have one or more interactive relationships between them such that the separate user interfaces may function as a whole and/or may otherwise complement each other.

As an example, a primary user interface may include a media menu tray user interface view displayed by a primary display device and that includes a "quick-launch" media menu tray containing a set of one or more user-selectable graphical objects representing a menu of one or more media programs, which may be selected for inclusion in the media menu tray based on one or more predefined media selection criteria. A secondary user interface may include a remote control user interface view that is displayed by a secondary display device while the media menu tray user interface view is displayed by the primary display device and that is tailored to facilitate remote user interaction with the media menu tray (e.g., based on a current state of the primary user interface view). Examples of ways that a secondary user interface, such as a remote control user interface view, may be tailored to a primary user interface, such as a media menu tray user interface view, are described herein.

Primary and secondary user interfaces may complement each other in one or more ways that facilitate an intuitive and/or quality user experience for a user interacting with a media service. Exemplary media service user interface systems and methods, as well as examples of user interfaces provided by the systems and methods, will now be described in reference to the drawings.

Figure 1:
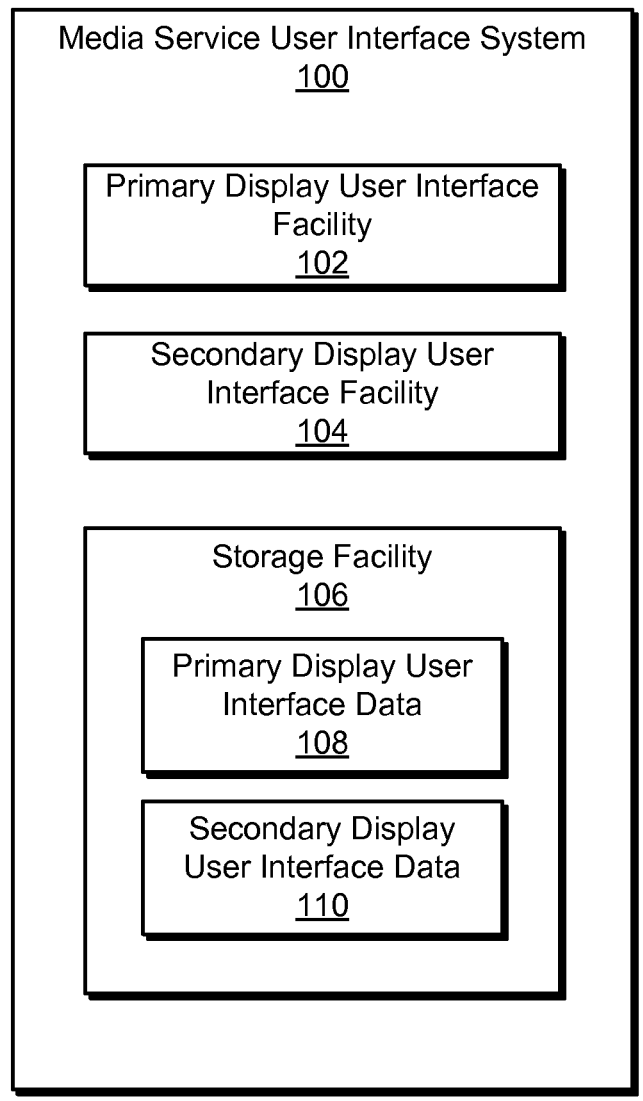
FIG. 1 illustrates an exemplary media service user interface system according to principles described herein.

FIG. 1 illustrates an exemplary media service user interface system 100 ("system 100"). System 100 may provide one or more user interfaces through which a user may interact with a media service. The media service may include any service by way of which an end user of the service may discover, access, and/or consume media content and/or information about media content. For example, the media service may include a television programming service (e.g., a subscriber television service), an on-demand media service (a video-on-demand service), a video distribution service, and/or any other service that distributes media content and/or media content information to a user. Through one or more user interfaces provided by system 100, an end user of the media service may discover, access, and/or consume media content and/or information about media content.

As used herein, the term "media content" may refer to any form of media that may be distributed by way of a media service and consumed by an end user of the media service. Media content may include discrete instances of media, which may be referred to as media programs. The term "media program" may refer to any television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, or any other media program that a user may access by way of the media service. Such media programs that are made available for user consumption by way of the media service may be accessed and/or played back by an appropriately configured user computing device (e.g., a media player device) for presentation to the user.

As shown in FIG. 1, system 100 may include, without limitation, a primary display user interface facility 102 ("primary facility 102"), a secondary display user interface facility 104 ("secondary facility 104"), and a storage facility 106 selectively and communicatively coupled to one another. Any suitable communication technologies may be employed to facilitate communications between facilities 102-106.

Although facilities 102-106 are shown to be separate facilities in FIG. 1, any of those facilities may be combined into a single facility or split into additional facilities as may serve a particular implementation. Additionally or alternatively, one or more of the facilities 102-106 may be omitted from and external to system 100 in other implementations. Facilities 102-106 of system 100 may include or be otherwise implemented by one or more computing devices configured to perform one or more of the operations described herein. Facilities 102-106 will now be described in more detail.

Storage facility 106 may maintain primary display user interface data 108 received, generated, and/or used by primary facility 102. The primary display user interface data 108 may represent a user interface provided by primary facility 102, data used to generate a user interface provided by primary facility 102, and/or user input associated with (e.g., received through) a user interface provided by primary facility 102. Storage facility 106 may also maintain secondary display user interface data 110 received, generated, and/or used by secondary facility 104. The secondary display user interface data 110 may represent a user interface provided by secondary facility 104, data used to generate a user interface provided by secondary facility 104, and/or user input associated with (e.g., received through) a user interface provided by secondary facility 104. Storage facility 106 may maintain additional or alternative data as may serve a particular implementation.

Primary facility 102 may be configured to provide a media service user interface for display on a primary display device. Such a user interface may be referred to as a "primary user interface" and may be configured to facilitate user interaction with a media service by way of the primary user interface. A primary user interface may include media service user interface content such as media content, media content information, and/or user-selectable options associated with the media service. Accordingly, a user may view media service user interface content included in the primary user interface and/or may provide input to the media service through the primary user interface.

Primary facility 102 may provide the primary user interface by providing one or more primary user interface views for display on a primary display device. In certain examples, primary facility 102 may provide one primary user interface view at a time for display on the primary display device and may switch from providing one primary user interface view to providing another primary user interface view for display. Examples of primary user interface views are described herein.

Secondary facility 104 may be configured to provide a media service user interface for display on a secondary display device that is separate from the primary display device. Such a user interface may be referred to as a "secondary user interface" and may be configured to facilitate user interaction with the media service by way of the secondary user interface. A secondary user interface may include media service user interface content such as media content, media content information, and/or user-selectable options associated with the media service. Accordingly, a user may view media service user interface content included in the secondary user interface and/or may provide input to the media service through the secondary user interface.

Secondary facility 104 may provide the secondary user interface by providing one or more secondary user interface views for display on a secondary display device. In certain examples, secondary facility 104 may provide one secondary user interface view at a time for display on the secondary display device and may switch from providing one secondary user interface view to providing another secondary user interface view for display. Examples of secondary user interface views are described herein.

Primary facility 102 and secondary facility 104 may be configured to concurrently provide a primary user interface and a secondary user interface for display on a primary display device and a secondary display device, respectively. For example, while primary facility 102 provides a primary user interface view for display on the primary display device, secondary facility 104 may concurrently provide a secondary user interface view for display on the secondary display device such that a user may concurrently interact with the primary user interface view and the secondary user interface view.

The primary user interface and the secondary user interface may have one or more relationships between them. For example, the primary user interface may be tailored for the secondary user interface and/or vice versa. As used herein, a user interface that is "tailored" for another user interface may include user interface content, such as user interface content representing specific media content, media content information, other information, user-selectable options, user interface features, etc., selected for inclusion in the user interface based on the content and/or state of the other user interface. Relationships between the primary and secondary user interfaces may be leveraged such that the primary and secondary user interfaces complement one another to the benefit of a user who interacts with a media service through the primary and/or secondary user interfaces.

As an example of a relationship between primary and secondary user interfaces, secondary facility 104 may be configured to select secondary user interface content for inclusion in the secondary user interface based on one or more attributes of the primary user interface (e.g., primary user interface content included in the primary user interface, a state of the primary user interface, etc.). In certain examples, the secondary user interface may include user interface content that is related to (e.g., supplemental to) user interface content included in the primary user interface. To illustrate, the primary user interface may include a menu view, and the secondary user interface may include supplemental menu content related to the menu view and/or user-selectable options for interacting with the menu view.

As another example of a relationship between primary and secondary user interfaces, primary facility 104 may be configured to select primary user interface content for inclusion in the primary user interface based on one or more attributes of the secondary user interface (e.g., secondary user interface content included in the secondary user interface, a state of the secondary user interface, etc.). In certain examples, the primary user interface may include user interface content that is related to (e.g., supplemental to) user interface content included in the secondary user interface. To illustrate, the secondary user interface may include a menu view, and the primary user interface may include content related to the menu view.

As another example of a relationship between primary and secondary user interfaces, primary facility 102 may be configured to update primary user interface content in the primary user interface based on a user interaction with the secondary user interface. In certain examples, the secondary user interface may be configured to function as a remote control user interface through which the user may remotely interact with (e.g., control) the primary user interface. For instance, the secondary user interface may include a remote control user interface view displayed on a secondary display device and configured to receive user input commands to interact with the primary user interface displayed on a primary display device.

In certain examples, a relationship between primary and secondary user interfaces may be leveraged by secondary facility 104 to dynamically tailor a secondary user interface to a primary user interface based on one or more attributes of the primary user interface. As used herein, dynamic tailoring of a user interface refers to performing one or more operations to configure the user interface based on one or more current attributes of another user interface. For example, secondary facility 104 may dynamically tailor a secondary user interface based on a current state of a primary user interface by determining the current state of the primary user interface (e.g., by communicating with primary facility 102) and selecting user interface content for inclusion in the secondary user interface based on the current state of the primary user interface. Examples of dynamic tailoring of a user interface are described herein.

To facilitate relationships between a primary user interface displayed on a primary display device and a secondary user interface displayed on a secondary display device and/or dynamic tailoring of a user interface based on another user interface, primary facility 102 and secondary facility 104 may communicate one with another using any suitable technologies, as mentioned. In certain implementations, such communications may include direct and/or indirect inter-device communications between a first user device that provides the primary user interface for display on a primary display device and a separate, second user device that provides the secondary user interface for display on the secondary display device. In certain other implementations, such communications may include direct and/or indirect inter-device communications between the first user device that provides the primary user interface for display on the primary display device, the second user device that provides the secondary user interface for display on the secondary display device, and one or more other devices such as one or more server and/or network devices.

Figure 2:
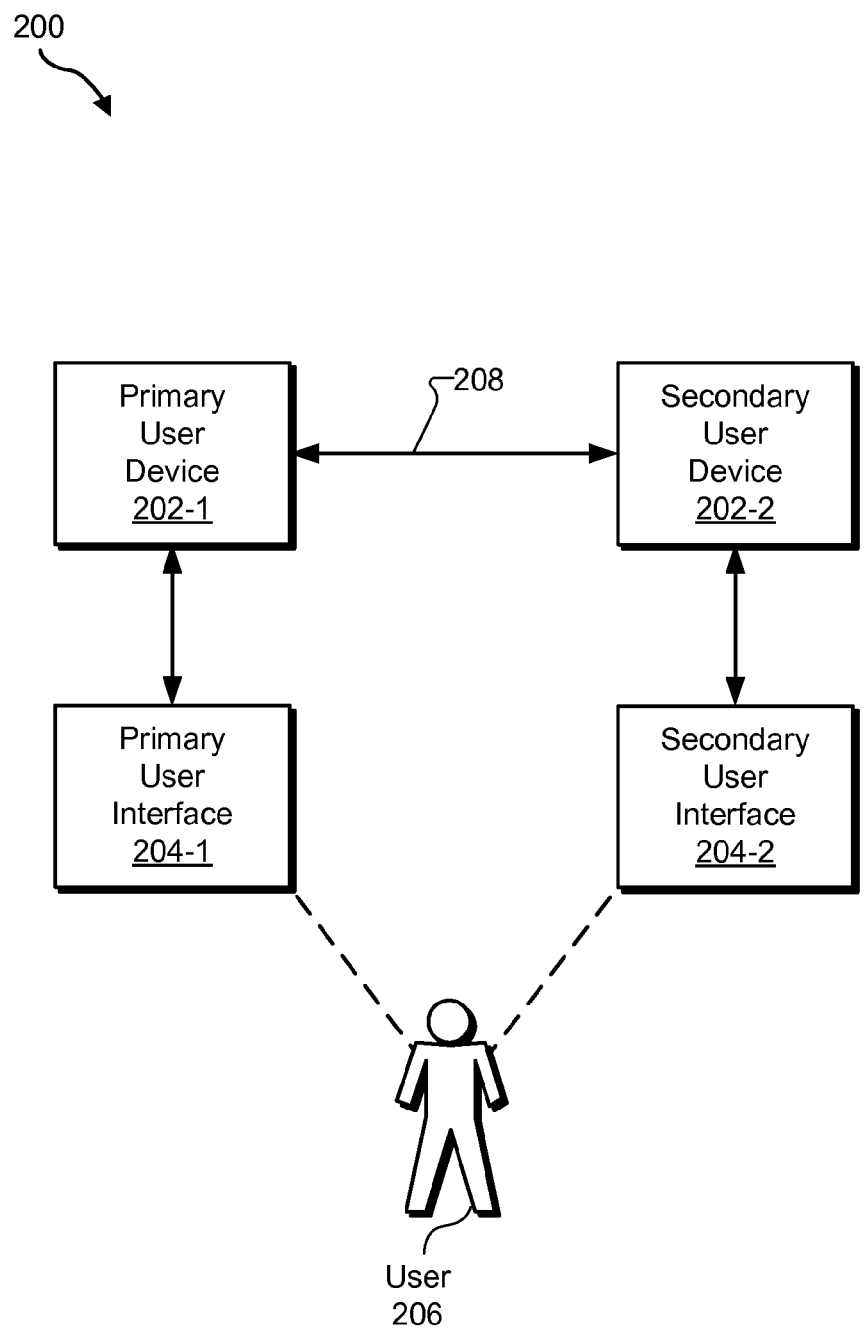
FIGS. 2-4 illustrate exemplary implementations of the system of FIG. 1 according to principles described herein.

FIG. 2 illustrates an exemplary implementation 200 of system 100. As shown, implementation 200 may include a primary user device 202-1 and a secondary user device 202-2, which may be separate user devices (e.g., separate, standalone electronic devices) configured to drive separate display devices. For example, primary user device 202-1 may drive a primary display device, which may be integrated within or external to the primary user device 202-1, and secondary user device 202-2 may drive a secondary display device, which may be integrated within or external to the secondary user device 202-2. Accordingly, primary user device 202-1 may provide a primary user interface 204-1 for display on a primary display device, and secondary user device 202-2 may provide a secondary user interface 204-2 for display on a secondary display device.

A user 206 may interact with primary user device 202-1, primary user interface 204-1, secondary user device 202-2, and/or secondary user interface 204-2 in order to interact with a media service. For example, through primary user interface 204-1 and/or secondary user interface 204-2, the user 206 may interact with primary user device 202-1, secondary user device 202-2, and/or a media service to discover, access, and/or consume media content and/or media content information available through the media service.

As mentioned, a primary user interface and a secondary user interface, such as primary user interface 204-1 and secondary user interface 204-2, may have one or more relationships between them. To facilitate a relationship between primary user interface 204-1 and secondary user interface 204-2, primary user device 202-1 that provides primary user interface 204-1 and secondary user device 202-2 that provides secondary user interface 204-2 may be configured to communicate one with another and/or with one or more other devices.

In implementation 200, for example, primary user device 202-1 and secondary user device 202-2 may be configured to communicate directly one with another, as represented by arrow 208. Arrow 208 may represent any suitable form of direct communications between primary user device 202-1 and secondary user device 202-2, such as direct wireless communications (e.g., Bluetooth communications, radio frequency communications ("RF"), near field communications ("NFC"), etc.).

While FIG. 2 illustrates an example of primary user device 202-1 and secondary user device 202-2 communicating directly with each other, primary user device 202-1 and secondary user device 202-2 may communicate in other ways in other examples. For example, primary user device 202-1 and secondary user device 202-2 may communicate indirectly with one another, such as through one or more other devices and/or one or more networks.

Figure 3:
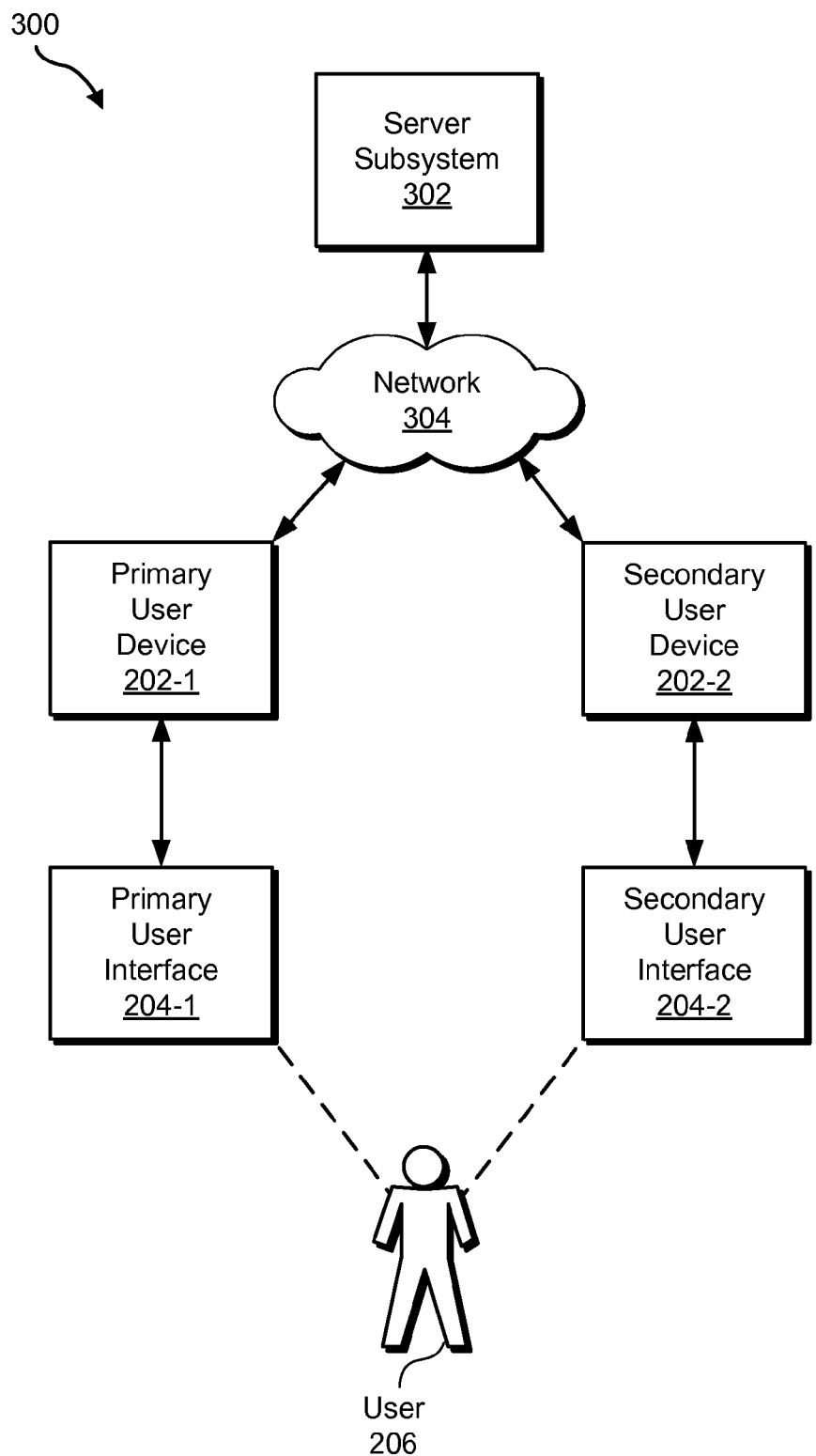

FIG. 3 illustrates another exemplary implementation 300 of system 100. In implementation 300, primary user device 202-1 and secondary user device 202-2 may be configured to communicate with a server subsystem 302. Communications between server subsystem 302 and primary user device 202-1 and secondary user device 202-2 may use any suitable communications technologies. For example, the communications between server subsystem 302 and primary user device 202-1 and secondary user device 202-2 may use communication technologies such as Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Long Term Evolution ("LTE") technologies, Short Message Service ("SMS"), Multimedia Message Service ("MMS"), radio frequency ("RF") signaling technologies, wireless communication technologies, Internet communication technologies, media streaming technologies, and other suitable communications technologies.

In certain examples, primary user device 202-1 and secondary user device 202-2 may communicate with the server subsystem 302 by way of a network 304. Network 304 may include one or more networks, such as one or more wireless networks, mobile telephone networks (e.g., cellular telephone networks), the Internet, local area networks (Wi-Fi networks), wide area networks (e.g., LTE networks), and any other networks capable of carrying communications between server subsystem 302 and primary user device 202-1 and secondary user device 202-2. Communications between server subsystem 302 and primary user device 202-1 and secondary user device 202-2 may be by way of any one of the above-listed networks, or any combination or sub-combination of the above-listed networks.

Server subsystem 302 may include one or more computing devices, such as one or more server devices remotely located from primary user device 202-1 and secondary user device 202-2, configured to perform one or more of the operations described herein. In certain examples, server subsystem 302 may be associated with (e.g., provided and/or operated by) a provider of a media service with which the user 206 may interact through primary user interface 204-1 and/or secondary user interface 204-2.

Primary user device 202-1 and secondary user device 202-2 may each include a computing device associated with (e.g., operated by) the user 206 and configured to perform one or more of the operations described herein. For example, primary user device 202-1 and secondary user device 202-2 may each include a tablet computer device, smart phone device, set-top-box device, television device, media access device, media player device, media service gateway device, consumer electronics device, and/or any other device capable of being operated by a user and of providing a media service user interface for display on a display device.

System 100 may be implemented in implementation 200 or implementation 300 in any suitable way. For example, one or more facilities of system 100 may be implemented entirely by primary user device 202-1, entirely by secondary user device 202-2, or entirely by server subsystem 302. Alternatively, one or more of the facilities of system 100 may be distributed across primary user device 202-1, secondary user device 202-2, and/or server subsystem 302. To illustrate, primary facility 102 may be implemented entirely by primary user device 202-1 or distributed across primary user device 202-1 and server subsystem 302. Similarly, secondary facility 104 may be implemented entirely by secondary user device 202-2 or distributed across secondary user device 202-2 and server subsystem 302.

As mentioned, primary facility 102 may provide a primary user interface (e.g., primary user interface 204-1) for display on a primary display device, and secondary facility 104 may provide a secondary user interface (e.g., secondary user interface 204-2) for display on a secondary display device. This may include primary facility 102 providing a primary user interface view for display on the primary display device and secondary facility 104 providing a secondary user interface view for display on the secondary display device.

Figure 4:
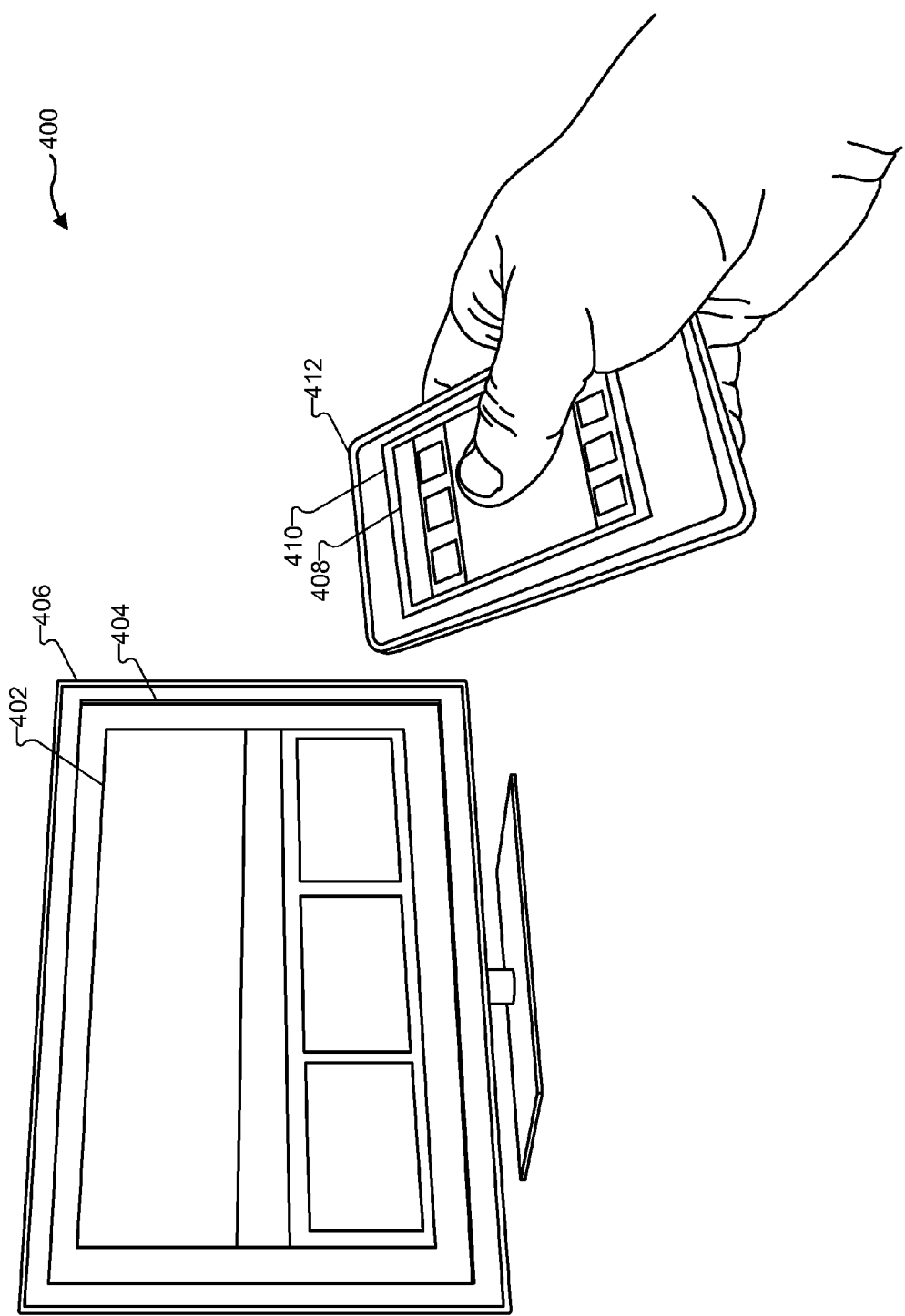

FIG. 4 illustrates an exemplary implementation 400 in which a primary user interface view 402 is displayed on a display screen 404 of a primary display device 406 and in which a secondary user interface view 408 is displayed on a display screen 410 of a secondary display device 412. In the example illustrated in FIG. 4, primary display device 406 includes a display device such as a television or computer monitor display device, and secondary display device 412 includes a display device such as mobile device (e.g., a smart phone, computer tablet device, handheld computing device, remote control device, etc.) having an integrated display screen.

Secondary display device 412 may be configured to function as a remote control device such that a user may operate the secondary display device 412 to remotely interact with the primary user interface displayed on the primary display device 406. To this end, secondary user interface view 408 may include a remote control user interface view tailored to facilitate user interaction to remotely interact with (e.g., control) the primary user interface view 402 that is concurrently displayed on the primary display device 406.

Examples of user interface views that may be provided by primary facility 102 and secondary facility 104 for display on a primary display device and a secondary display device, respectively, as well as exemplary relationships between the user interface views and dynamic tailoring of user interface views, will now be described.

Figure 5:
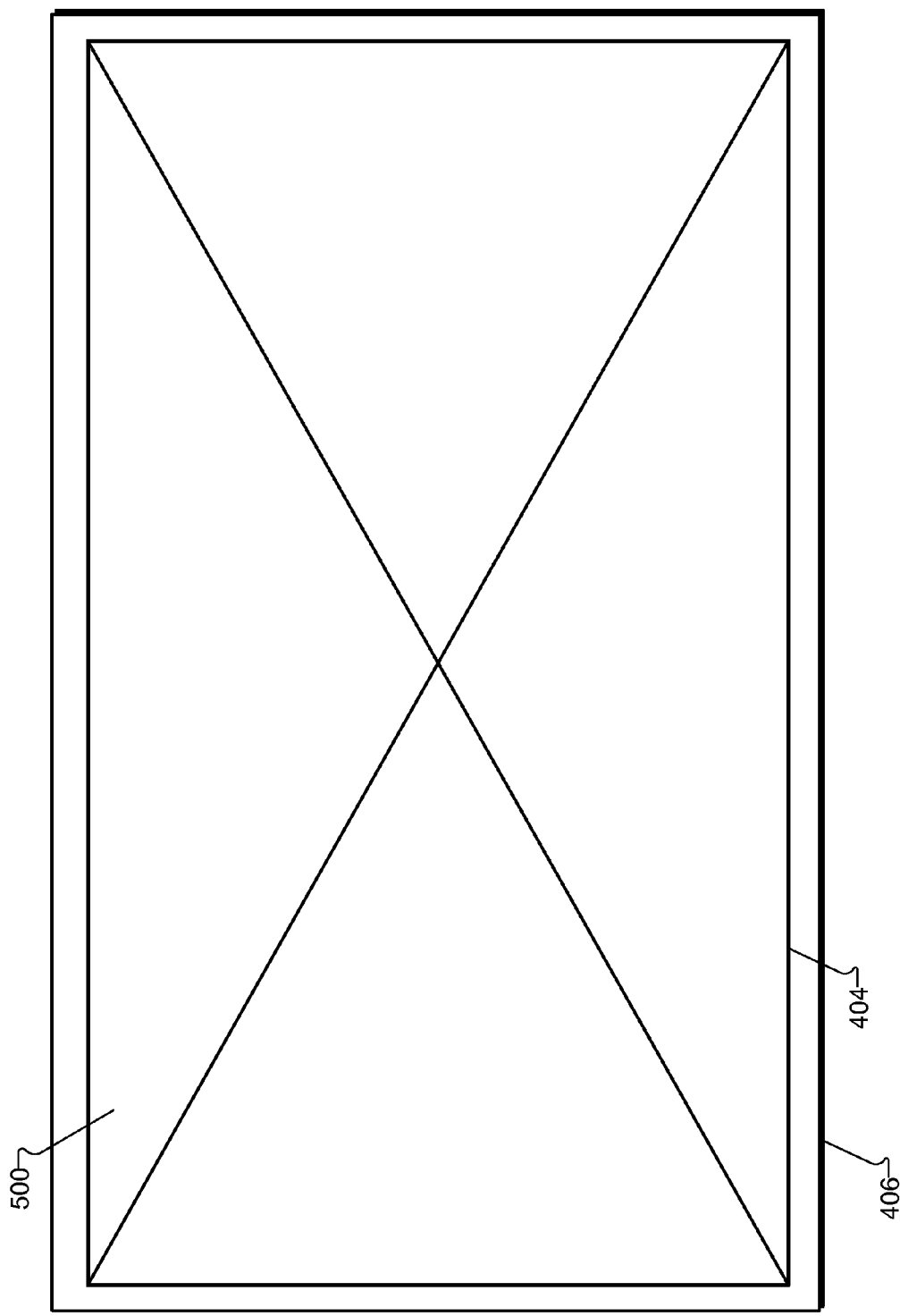
FIGS. 5-10 illustrate examples of media service user interface views displayed on display screens of primary and secondary devices according to principles described herein.

FIG. 5 illustrates an example of a primary user interface view 500 that may be provided by primary facility 102 for display on display screen 404 of primary display device 406. In the illustrated example, primary user interface view 500 includes a main content view in which the main content of the view, represented by two intersecting diagonal lines extending between opposing corners of display screen 404 in FIG. 5, occupies substantially the full area of display screen 404. In certain examples, the main content view may be a full-screen video playback view in which the main content includes video content being played back on substantially the full area of display screen 404.

Figure 6:
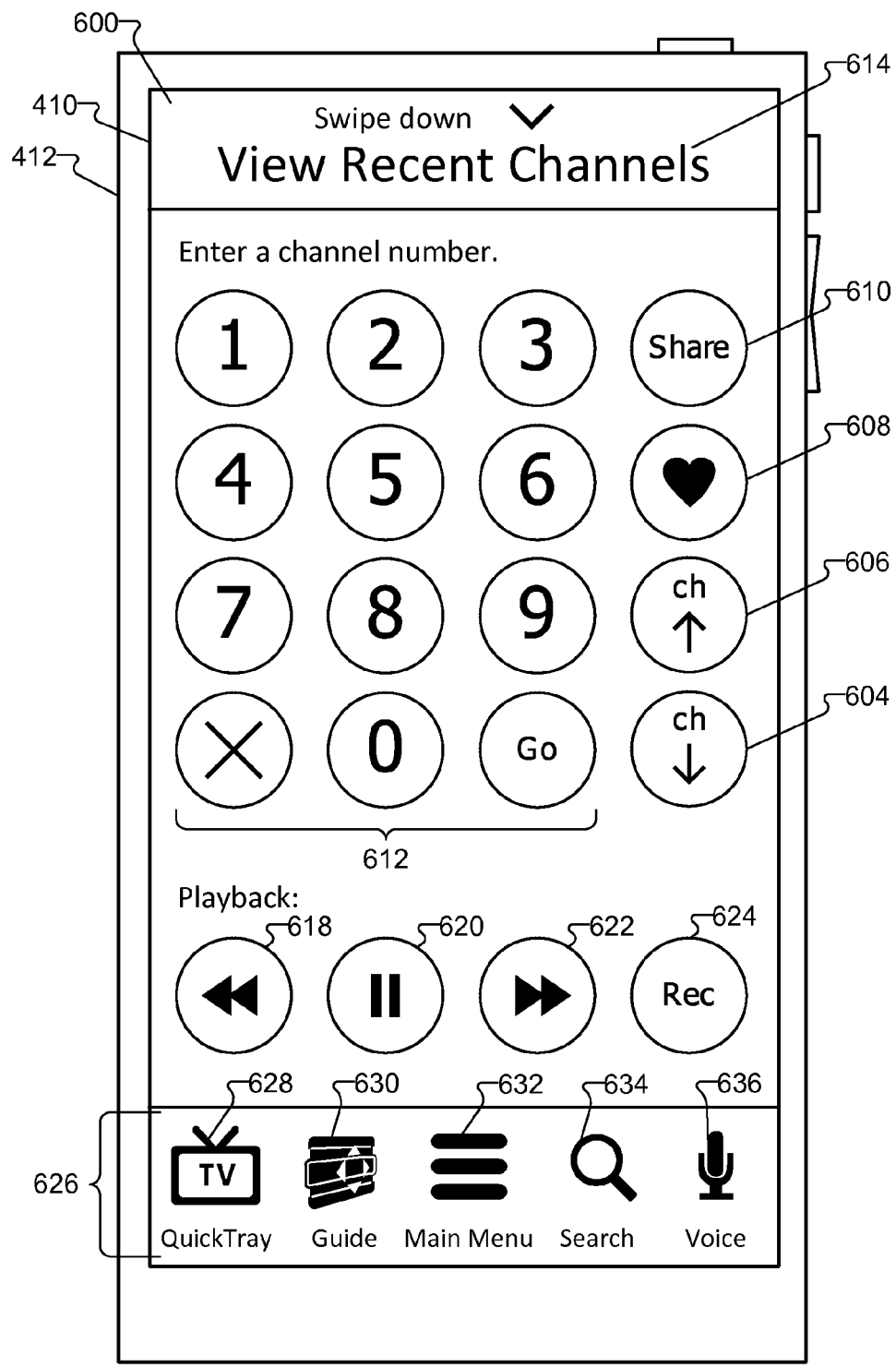

FIG. 6 illustrates an example of a secondary user interface view 600 that may be provided by secondary facility 104 for display on display screen 410 of secondary display device 412 while primary user interface view 500 is displayed by primary display device 406. Secondary user interface view 600 may be tailored for primary user interface view 500. For example, secondary facility 104 may select user interface content for inclusion in secondary user interface view 600 based on the content and/or state of primary user interface view 500. Secondary facility 104 may perform the selection in any suitable way. For example, secondary facility 104 may detect that primary user interface view 500 is being displayed and/or includes a full-screen video playback user interface view and, in response, may select user interface content related to the full-screen video playback user interface view for inclusion in secondary user interface view 600.

In the example illustrated in FIG. 6, secondary user interface view 600 includes user-selectable options tailored to facilitate remote interaction with a full-screen video playback user interface view. As shown, the user-selectable options may include a set of options configured to facilitate navigation of and/or other interaction with media programming channels (e.g., television programming channels) on which media content is distributed. Using the set of options, a user may select a particular channel of media content that is accessed and presented on primary display device 406 and/or may otherwise interact with the primary user interface provided for display on primary display device 406. The set of options may include a channel-down option 604 for switching to a next lower channel number, a channel-up option 606 configured for switching to a next higher channel number, a rating option 608 for rating a channel and/or media program being presented on primary display device 406, a share option 610 for sharing a channel and/or media program being presented on primary display device 406 and/or information about the channel and/or media program with another person (e.g., another user of the media service and/or a social media contact of the user), and a channel number input pad 612 for entering of a specific channel number of a channel to access. The set of options may further include an option 614 for accessing a list of recently viewed channels, which may be used by the user to switch to accessing one of the recently viewed channels indicated in the list.

As further shown, the user-selectable options may include a set of options for use by a user to control video playback in the full-screen video playback user interface view displayed by primary display device 406. The set of options may include one or more trick-play control options, such as an option 618 for rewinding playback, an option 620 for pausing and resuming playback, an option 622 for fast-forwarding playback, and an option 624 for starting and stopping recording of playback.

The sets of user-selectable options for interacting with channels and video playback, as illustrated in FIG. 6, are tailored to facilitate remote user interaction with a full-screen video playback user interface view being displayed by primary display device 406. For example, the sets of user-selectable options are configured to be used by a user to select a media programming channel to be accessed and to control video playback to be displayed by primary display device 406.

The specific user-selectable options and configuration of user-selectable options shown in FIG. 6 are illustrative only. Other user-selectable options and/or configurations of user-selectable options may be included in other examples of a secondary user interface view to tailor the secondary user interface view for remote user interaction with a full-screen video playback user interface view being displayed by primary display device 406.

As further shown in FIG. 6, secondary user interface view 600 may include a menu 626 of options that may be persistent across different secondary user interface views of a secondary user interface. The menu 626 of options may be configured for use by a user to control a primary user interface displayed by primary display device 406. For example, the menu 626 of options may include a "quick tray" option 628 for launching and hiding a media menu tray in the primary user interface, a "guide" option 630 for launching a program guide in the primary user interface, a "main menu" option 632 for launching a main menu in the primary user interface, a "search" option 634 for launching a search feature in the primary user interface and/or secondary user interface, and a "voice" option 636 for launching a voice input feature in the primary user interface and/or secondary user interface.

In response to a user selection of the "quick tray" option 628 in secondary user interface view 600, primary facility 102 may launch a media menu tray in the primary user interface. This may include primary facility 102 providing a media menu tray user interface view for display by primary display device 406.

Figure 7:
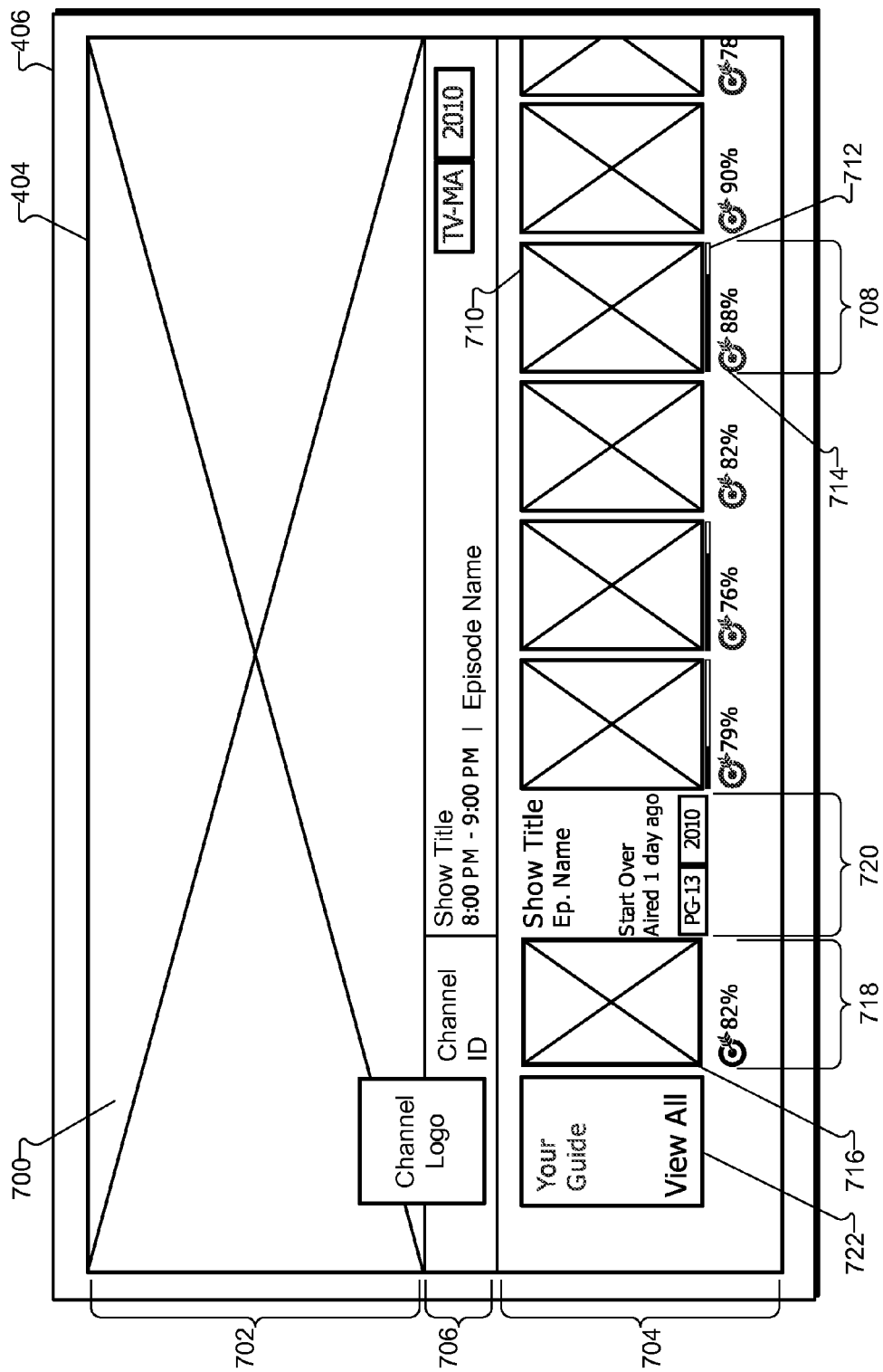

FIG. 7 illustrates an example of a primary user interface view 700 that may be provided by primary facility 102 for display on display screen 404 of primary display device 406. In the illustrated example, primary user interface view 700 includes a media menu tray user interface view in which main user interface content 702 ("main content 702") is displayed on a first portion of display screen 404, a media menu tray 704 is displayed on a second portion of display screen 404, and main content information 706 is displayed on a third portion of display screen 404 disposed between the main content 702 and the media menu tray 704.

In certain examples, the main content 702 may include video content being played back on the first portion of display screen 404. Accordingly, the primary user interface view 700 may include a partial-screen playback of video content.

Main content information 706 may include any information related to the main content 702. For example, when the main content 702 includes video content being played back, main content information 706 may include information about a programming channel on which the video content is distributed, a title of the video content, a time slot within which the video content is distributed in accordance with a predefined distribution schedule, a release date of the video content, a rating of the video content, and/or any other information about the video content.

Media menu tray 704 may include media menu tray user interface content representing a media program menu. For example, media menu tray 704 may include a set of one or more user-selectable graphical objects (e.g., cover art thumbnail images) representing a menu of one or more media programs. The graphical objects may be arranged in any suitable configuration. For example, the graphical objects may be arranged in a single horizontal row as shown. As another example, the graphical objects may be arranged in a two-dimensional matrix grid that includes multiple rows (e.g., media program category rows) and/or columns of graphical objects. One or more rows of the grid may be presented at a time within media menu tray 704. For instance, one row at a time may be displayed within media menu tray 704, and user input may be provided by a user to select which of the rows is displayed in the media menu tray 704.

Each graphical object in the media program menu may represent a media program and may indicate information about the media program. For example, a graphical object 708 may include a cover art image 710 for a media program (the cover art represented by two crossing diagonal lines extending between opposite corners of a rectangle), a progress bar 712 indicating how much of the media program has been played back to a user (if playback of the media program was previously initiated and not yet completed), and a relevancy indicator 714 indicating a relevancy score representing how relevant the media program is to the user.

Media menu tray 704 may include a selector object 716 configured to be moved in accordance with user input to highlight a graphical object within a set of graphical objects representing a menu of media programs. In FIG. 7, selector object 716 is positioned to highlight a particular graphical object 718. When a graphical object is highlighted by selector object 716, primary facility 102 may insert additional information about the media program represented by the highlighted graphical object in media menu tray 704. For example, FIG. 7 shows media menu tray 704 to include additional information 720 about the media program. In the illustrated example, the additional information 720 includes the title of the media program, an episode name of the media program, a rating for the media program, and a release date of the media program. The additional information 720 may also indicate information about distribution of the media program, such as information indicating when the media program was last distributed (e.g., "Aired 1 day ago"), and/or any other information about the media program.

A menu of media programs represented in media menu tray 704 may include a category-based collection of media programs, such as a collection of media programs selected from a particular category of media programs. A category of media programs (i.e., a media program category) may include any category into which media programs may be grouped based on one or more common attributes of the media programs.

In certain examples, each category of media programs may be associated with a different media distribution platform by way of which media programs are distributed and/or accessible. For example, a category of media programs may represent media programs distributed in accordance with a media-provider-defined media program distribution schedule (e.g., television programs distributed in accordance with a television programming schedule). Such a category may be referred to as a category of "scheduled-type" media programs. Another category of media programs may represent recorded media programs accessible by way of a digital video recorder ("DVR") device (e.g., a personal DVR device at a customer premises). Such a category may be referred to as a category of "recorded-type" media programs. Another category of media programs may represent media programs that are accessible on-demand (e.g., from an on-demand media distribution platform). Such a category may be referred to as a category of "on-demand-type" media programs. Another category of media programs may represent media programs that are accessible from a third-party Internet and/or World Wide Web platform and/or service (e.g., from a third-party web videos service). Such a category may be referred to as a category of "web-service-type" media programs. These examples of categories of media programs are illustrative only. Other categories of media programs may be represented in media menu tray 704 in other examples.

In certain examples, media menu tray 704 may represent a single category of media programs. In certain other examples, media menu tray 704 may represent multiple categories of media programs, with the media programs being grouped (e.g., into rows) by category.

A menu of media programs represented in media menu tray 704 may include a collection of recommended media programs, such as a collection of media programs selected by system 100 for recommendation to a particular user. The media programs may be selected for recommendation and/or inclusion in the collection in any suitable way and based on any suitable predefined criteria. For example, media programs may be selected based on user information (e.g., user preferences), a history of user interaction with a media service (e.g., interaction with a media service user interface) and/or media programs, a history of device interaction with a media service (e.g., interactions of a user device shared by multiple users, such as a set-top-box device, with a media service), statuses of media programs (e.g., scheduled distribution status, availability status, access cost, etc.), media program metadata, and/or any other information potentially helpful for determining media programs that are relevant or otherwise of potential interest to the user.

For example, in response to a user request to launch media menu tray 704, primary facility 102 may select, from one or more libraries of media programs and based on one or more criteria, a set of media programs to be represented in the media menu tray 704. To illustrate one example, primary facility 102 may base the selection on metadata associated with a media program currently being played back when the user request is received. Accordingly, primary facility 102 may select one or more media programs that share one or more attributes of the currently playing media program.

Additionally or alternatively, primary facility 102 may base the selection on a distribution schedule of media programs. Accordingly, primary facility 102 may select one or more media programs that are currently being distributed, are about to be distributed (e.g., will begin to be distributed within a predefined amount of time or at the start of a next sequential time slot), and/or have been recently distributed (e.g., were distributed within a predefined amount of time such as up to three days ago) in accordance with a media-provider-defined media distribution schedule. In FIG. 7, for example, media menu tray 704 may represent scheduled-type media programs that include at least one of a media program currently being distributed in accordance with the media-provider-defined media program distribution schedule, a media program about to be distributed in accordance with the media-provider-defined media program distribution schedule, and a media program recently distributed in accordance with the media-provider-defined media program distribution schedule.

In certain examples, the media program that was recently distributed in accordance with the schedule may be made available by the media service provider. For example, a system of the media service provider (e.g., server subsystem 302) may record the media program while the media program is distributed in accordance with the schedule and maintain and make a copy of the recording available for user access for a predetermined length of time such as up to three days after the scheduled distribution of the media program. This may allow the recently distributed media program to be made available for user access for an extended period of time as part of the media service.

Additionally or alternatively to the above-described examples, primary facility 102 may base the selection of media programs on information about primary user device 202-1, such as a history of interaction by the primary device 202-1 with the media service. Accordingly, primary facility 102 may select one or more media programs for inclusion in media menu tray 704 based on historical operations of the primary user device 202-1.

Additionally or alternatively to the above-described examples, primary facility 102 may base the selection of media programs on information about a particular user, such as a history of interaction by the user with the media service, user input, a media watch list curated by the user, user preferences, etc. Accordingly, primary facility 102 may select one or more media programs for inclusion in media menu tray 704 based on information associated with a user.

A menu of media programs represented in media menu tray 704 may include a category-based collection of recommended media programs, such as a collection of media programs selected from a particular category of media programs for recommendation to a user. For example, the menu of media programs represented in media menu tray 704 in FIG. 7 includes a collection of media programs that are recommended to the user and are selected from a category of scheduled-type media programs distributed in accordance with a media-provider-defined media program distribution schedule (e.g., media programs distributed in accordance with a television programming schedule).

Media menu tray 704 may include a graphical object indicating a particular category of media programs represented in media menu tray 704. In FIG. 7, for example, media menu tray 704 includes a graphical object 722 positioned at an end of a row of graphical objects representing the menu of media programs. As shown, graphical object 722 indicates that the media programs represented in media menu tray 704 are associated with a category labeled "Your Guide," which category may include media programs distributed by a media service provider in accordance with a television programming schedule.

Graphical object 722 may be selectable by a user to launch another primary user interface view, such as a media program guide user interface view, for display by primary display device 406. In some examples, the media program guide user interface view may represent an entire set of media programs in a category. In other examples, the media program guide user interface view may represent a collection of media programs in a category and recommended to a user, with the collection and/or features in the media program guide user interface view being more robust than the collection and/or features in media menu tray 704.

Figure 8:
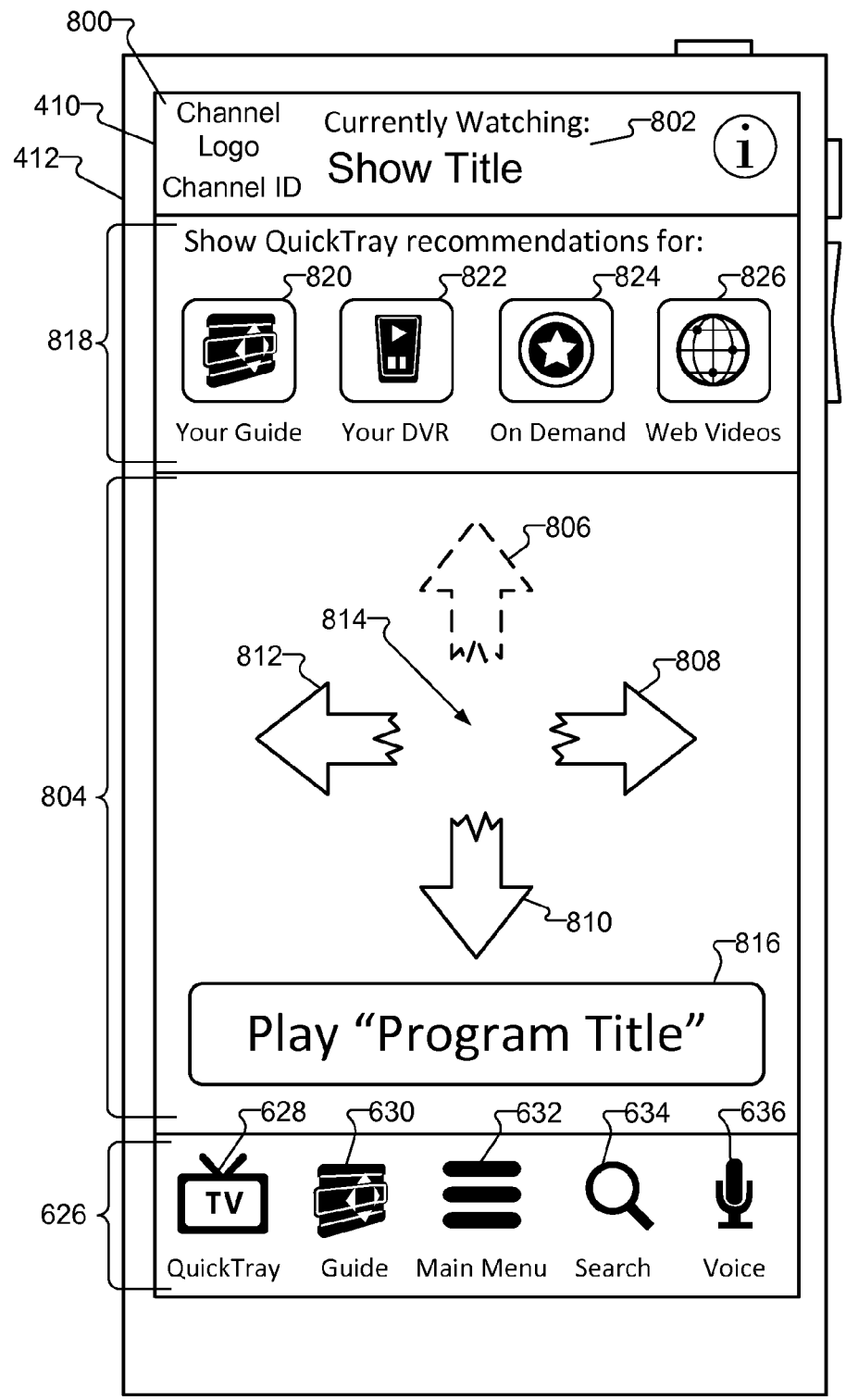

FIG. 8 illustrates an example of a secondary user interface view 800 that may be provided by secondary facility 104 for display on display screen 410 of secondary display device 412 while primary user interface view 700 is displayed by primary display device 406. As shown, secondary user interface view 800 may include the persistent menu 626 described above in reference to secondary user interface view 600 of FIG. 6.

Secondary user interface view 800 may be tailored for primary user interface view 700. For example, secondary facility 104 may select secondary user interface content for inclusion in secondary user interface view 800 based on the content and/or state of primary user interface view 700. Secondary facility 104 may perform the selection in any suitable way. For example, secondary facility 104 may detect that primary user interface view 700 is being displayed, includes a media menu tray user interface view, and/or has a particular state and, in response, may select content related to the media menu tray user interface view and/or state for inclusion in secondary user interface view 800.

As an example, secondary user interface 800 may include information 802 about the main content 702 being presented in primary user interface 700. In FIG. 8, the information 802 is about a media program currently being presented within a section of the media menu tray user interface view displayed by the primary display device 406. Secondary facility 104 may detect the media program that is currently being played back and select information 802 about the media program for inclusion in secondary user interface view 800. In certain examples, media program information 802 displayed in secondary user interface view 800 may be selectable by a user to launch a full-screen playback of the corresponding media program by primary display device 404.

Secondary facility 104 may select, for inclusion in secondary user interface view 800, secondary user interface content tailored specifically to the media menu tray 704 included in the primary user interface view 700 shown in FIG. 7. In certain examples, secondary user interface view 800 may include a remote control user interface view that includes user interface content tailored to facilitate remote user interaction with the media menu tray 704 included in the media menu tray user interface view provided for display on the display screen 404 of the primary display device 406. The remote control user interface view may include user interface content configured to facilitate remote user interaction with (e.g., control of) the media menu tray 704 and/or other elements of primary user interface view 700.

In the example illustrated in FIG. 8, secondary user interface view 800 includes user-selectable options tailored for remote interaction with the media menu tray 704. The user-selectable options may include a set 804 of options configured to facilitate user navigation and selection of user-selectable media menu options included in the media menu tray 704. For example, the set 804 of options may form a virtual directional pad ("D-pad") that includes an up directional arrow 806, a right directional arrow 808, a down directional arrow 810, and a left directional arrow 812 selectable by a user to cause selector object 716 to be moved up, right, down, and left, respectively, from menu option to menu option in the media menu tray 704. The D-pad may further include a selectable area 814 centered within the directional arrows 806, 808, 810, and 812. The selectable area 814 may be configured to function as a selection button selectable by a user to select, and thereby initiate performance of one or more operations associated with a menu option that is currently highlighted by the selector object 716 in the media menu tray 704.

Secondary facility 104 may dynamically activate and deactivate one or more of the directional arrows 806, 808, 810, and 812 of the D-pad based on one or more attributes of the media menu tray 704 (e.g., based on a contextual position of the selector object 716 within the media menu tray 704). For example, secondary facility 104 may deactivate a particular directional arrow when the selector object 716 is contextually positioned such that movement of the selector object 716 in the direction of the particular directional arrow is not available. To illustrate, selector object 716 may be positioned in the media menu tray 704 such that there is not a selectable menu option upward from the selector object 716. Secondary facility 104 may detect that there is not a selectable menu option upward from the selector object 716 and, in response, deactivate the up directional arrow 806, which may remain inactive while the selector object 716 continues to remain at that position. When active, a directional arrow is user-selectable. When inactive, the directional arrow is not user-selectable.

Active and inactive directional arrows may be visually distinguished one from another in secondary user interface view 800. In FIG. 8, for example, directional arrow 806 is represented with dashed lines to visually depict that the directional arrow 806 is inactive, and directional arrows 808, 810, 812 are represented with solid lines to visually depict that the directional arrows 808, 810, 812 are active. This example is illustrative only. Active and inactive directional arrows may be visually distinguished in secondary user interface view 800 in any suitable way.

Secondary facility 104 may dynamically activate and deactivate user-selectable options in the secondary user interface view 800 as the context with the media menu tray 704 changes. For example, when the selector object 716 is moved from one position to another, secondary facility 104 may dynamically activate and/or deactivate one or more user-selectable options based on the new contextual position of the selector object 716 within the media menu tray 704.

The set 804 of options may further include one or more options configured to be selected by a user to initiate one or more specific operations associated with a highlighted media program. For example, in FIG. 8, the set 804 of options includes a direct play option 816 configured to be selected by the user to initiate playback of the media program currently highlighted in the media menu tray 704.

Secondary facility 104 may be configured to select the options included in secondary user interface facility 800 based on one or more attributes of the currently displayed primary user interface view 700. For example, secondary facility 104 may select direct play option 816 for inclusion in secondary user interface view 800 based on one or more attributes of the media menu tray 704 in primary user interface view 700. To illustrate, secondary facility 104 may determine that the graphical object 718 currently highlighted by selector object 716 represents a media program having a state that indicates that a user has not yet started to consume the media program. Based on this determination, secondary facility 104 may insert direct play option 816 in secondary user interface view 800 for use by the user to initiate playback of the media program at the beginning of the media program.

The user-selectable options in secondary user interface view 800 may additionally or alternatively include a set 818 of media program category options configured to facilitate user selection of a category of media programs to be represented in the media menu tray 704. Primary facility 102 may detect a user selection of a category option in secondary user interface view 800 and, in response, may toggle from representing one category of media programs to representing another category of media programs in the media menu tray 704.

The set 818 of category options may represent any categories of media programs. In FIG. 8, the set 818 of category options includes a "Your Guide" category option 820 representing a category of scheduled-type media programs distributed in accordance with a media-provider-defined media program distribution schedule (e.g., media programs distributed in accordance with a television programming schedule), a "Your DVR" category option 822 representing a category of recorded-type media programs accessible by way of an end-user digital video recorder ("DVR") device, an "On Demand" category option 824 representing a category of on-demand-type media programs accessible on-demand (e.g., from an on-demand media distribution platform), and a "Web Videos" category option 826 representing a category of web-service-type media programs accessible from the Internet and/or World Wide Web.

In certain examples, secondary facility 104 may dynamically tailor secondary user interface view 800 based on the content and/or state of the primary user interface view 700 being displayed by primary display device 406. The dynamic tailoring may include detecting the current content and/or a current state of the primary user interface view 700 and selecting secondary user interface content based on the detected content and/or state.

As an example, secondary facility 104 may determine a set of categories of media programs associated with the media menu tray (e.g., selected for inclusion in the media menu tray 704 and/or currently represented in the media menu tray 704) and select the set 818 of media program category options for inclusion in the media menu tray 704 based on the set of categories of media programs associated with the media menu tray 704. Accordingly, the set 818 of category options in secondary user interface view 800 may correspond to the set of media program categories associated with the media menu tray 704. In certain examples, the order of the category options in secondary user interface view 800 may be the same as the order (e.g., row-by-row order) of the media program categories in the media menu tray 704.

As another example, secondary facility 104 may determine a contextual position of selector object 716 within the media menu tray 704 and deactivate a user-selectable option (e.g., option 806) included in the media menu tray 704 based on the contextual position of selector object 716 within the media menu tray 704, such as described above.

As another example, secondary facility 104 may detect that selector object 716 is positioned, within the media menu tray 704, to highlight a particular user-selectable graphical object that represents a particular media program, determine a status of the media program (e.g., a playback state of the media program), and select a user-selectable option for inclusion in the secondary user interface view 800 based on the status of the media program. For example, if the status of the media program indicates a partial, unfinished playback of the media program, secondary facility 104 may select to include an option for resuming playback where playback was last stopped and/or an option to restart playback at the beginning of the media program.

While primary user interface view 700 and secondary user interface view 800 are concurrently displayed by primary display device 406 and secondary display device 412, respectively, a user may provide input (e.g., touch input on display screen 410) to select the "Web Videos" category option 826. In response, primary facility 102 may update the media menu tray 704 to represent media programs included in the "Web Videos" category instead of media programs included in the "Your Guide" category. This may include secondary facility 104 detecting the user selection of option 826, and directing, in response to the user selection, primary facility 102 to toggle from representing the "Your Guide" category of media programs to representing the "Web Videos" category of media programs in media menu tray 704.

Figure 9:
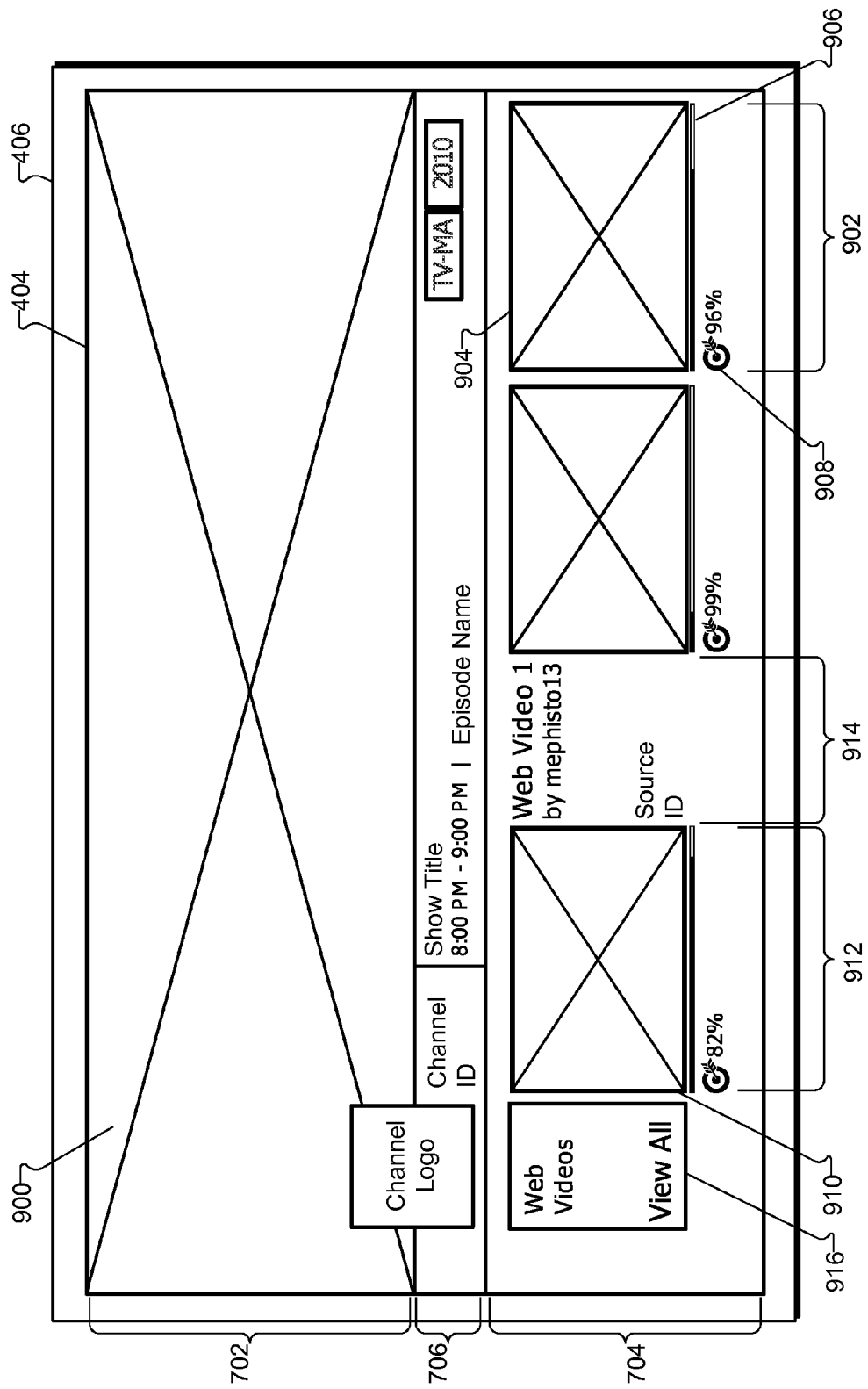

FIG. 9 illustrates an example of a primary user interface view 900 that may be provided by primary facility 102 for display on display screen 404 of primary display device 406. Primary user interface view 900 is like primary user interface view 700 except that the media menu tray 704 in primary user interface view 900 includes a set of graphical objects representing a different category of media programs, namely a "Web Videos" category of media programs.

Each graphical object representing a media program in the media program menu 704 shown in FIG. 9 may indicate information about the media program. For example, a graphical object 902 may include a cover art image 904 for a media program, a progress bar 906 indicating how much of the media program has been played back to a user, and a relevancy indicator 908 indicating a relevancy score representing how relevant the media program is to the user.

Media menu tray 704 in FIG. 9 may include a selector object 910 configured to be moved in accordance with user input to highlight a graphical object within a set of graphical objects representing a menu of media programs. In FIG. 9, selector object 910 is positioned to highlight a particular graphical object 912. When a graphical object is highlighted by selector object 910, primary facility 102 may insert additional information about the media program represented by the highlighted graphical object in media menu tray 704. For example, FIG. 9 shows media menu tray 704 to include additional information 914 about the media program. In the illustrated example, the additional information 914 indicates the title of the media program, an author of the media program, and a source of the media program. The additional information 914 may indicate any other information about the media program in other examples.

In FIG. 9, media menu tray 704 further includes a graphical object 916 positioned at an end of a row of graphical objects representing the menu of media programs. As shown, graphical object 916 indicates that the media programs represented in media menu tray 704 are associated with the "Web Videos" category of media programs.

Graphical object 916 may be selectable by a user to launch another primary user interface view, such as a web videos user interface view. In some examples, the web videos user interface view may represent an entire set of media programs in a category. In other examples, the web videos user interface view may represent a collection of media programs in a category that are recommended to a user, with the collection and/or features in the media program guide user interface view being more robust than the collection and/or features in media menu tray 704.

Secondary facility 104 may be configured to correspondingly update the secondary user interface based on changes to the content and/or state of the primary user interface. For example, in response to a change from primary user interface view 700 to primary user interface view 900 being displayed by primary display device 406, secondary facility 104 may correspondingly update the secondary user interface based on the current content and/or status of primary user interface view 900.

Figure 10:
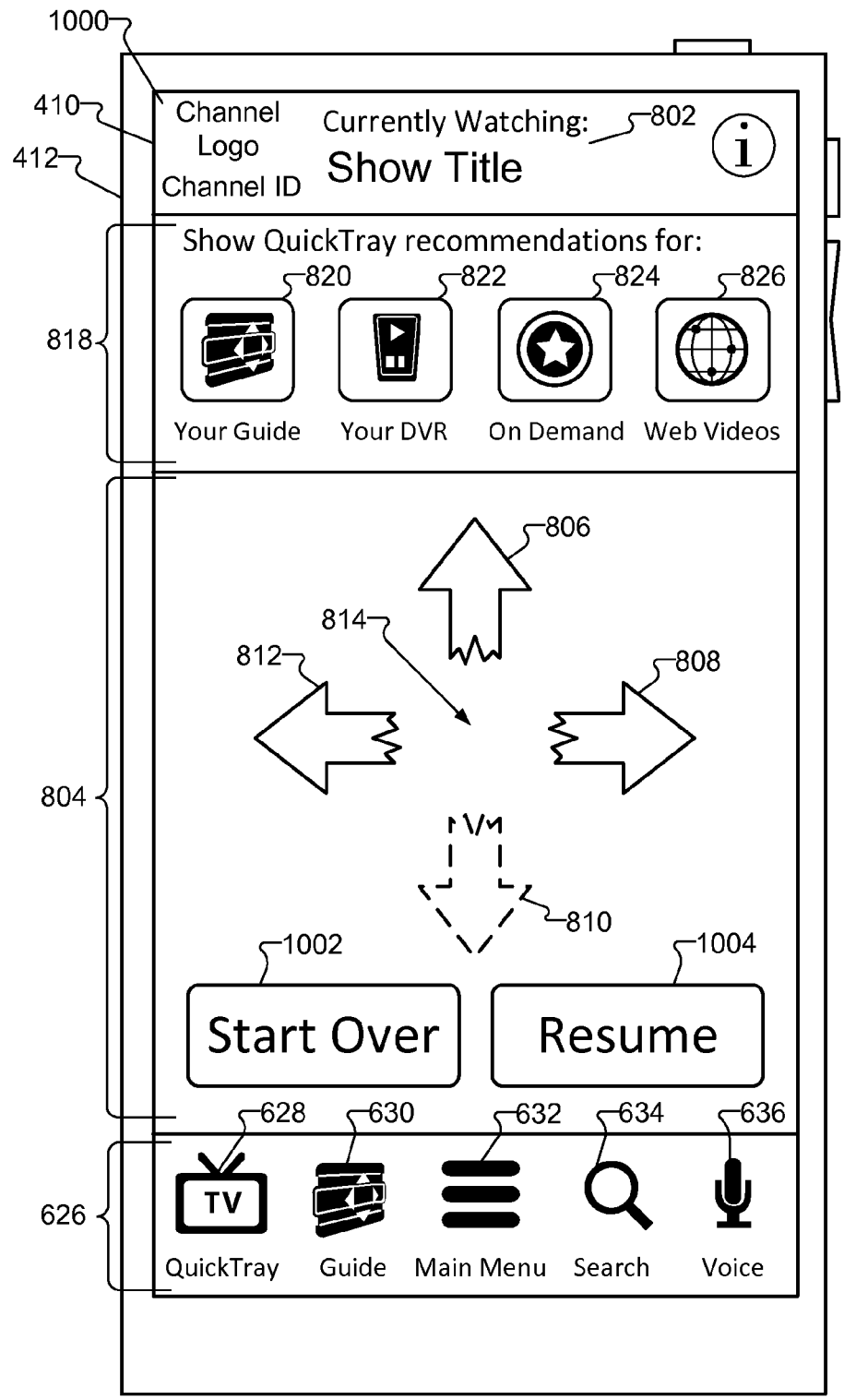

FIG. 10 illustrates an example of a secondary user interface view 1000 that may be provided by secondary facility 104 for display on display screen 410 of secondary display device 412 while primary user interface view 900 is displayed by primary display device 406. As shown, secondary user interface view 1000 may be like secondary user interface view 800 except that certain content may be tailored specifically to one or more attributes of primary user interface view 900 instead of one or more attributes of primary user interface view 700.

For example, instead of including option 816 in the set 804 of options, secondary user interface view 1000 includes options 1002 and 1004 dynamically selected for inclusion in secondary user interface view 1000 by secondary facility 104 based on one or more current attributes of primary user interface view 900. In particular, with selector object 910 positioned to highlight graphical object 912 representing a media program that has a status indicating that the media program has been partially consumed (as indicated by a progress bar included in the graphical object), secondary facility 104 may select options 1002 and 1004 for inclusion in secondary user interface facility 1000 to provide a user with an option 1002 to initiate playback of the media program at the beginning of the media program and an option 1004 to resume playback of the media program where the playback was stopped.

Primary facility 102 may dynamically switch from providing one primary user interface view to providing another primary user interface view for display by primary display device 406. For example, in response to a user request to launch media menu tray 704, primary facility 102 may switch from providing a non-media-menu primary user interface view to providing a media menu primary user interface view for display by primary display device 406. As another example, while a media menu primary user interface view is displayed, primary facility 102 may switch from providing the media menu primary user interface view to providing a non-media-menu primary user interface view in response to a user request to hide the media menu tray 704 from display by primary display device 406.

Secondary facility 102 may dynamically and correspondingly (i.e., corresponding to switches to the primary user interface view being displayed) switch from providing one secondary user interface view to providing another secondary user interface view for display by secondary display device 412. For example, corresponding to a switch from displaying a non-media-menu primary user interface view to displaying a media menu primary user interface view on primary display device 406, secondary facility 104 may switch from providing one secondary user interface view (e.g., a first remote control user interface view) tailored to the non-media-menu primary user interface view to providing another secondary user interface view (e.g., a second remote control user interface view) tailored to the media menu primary user interface view for display by secondary display device 412, or vice versa corresponding to a switch from a media menu primary user interface view to a non-media-menu primary user interface view.

Figure 11:
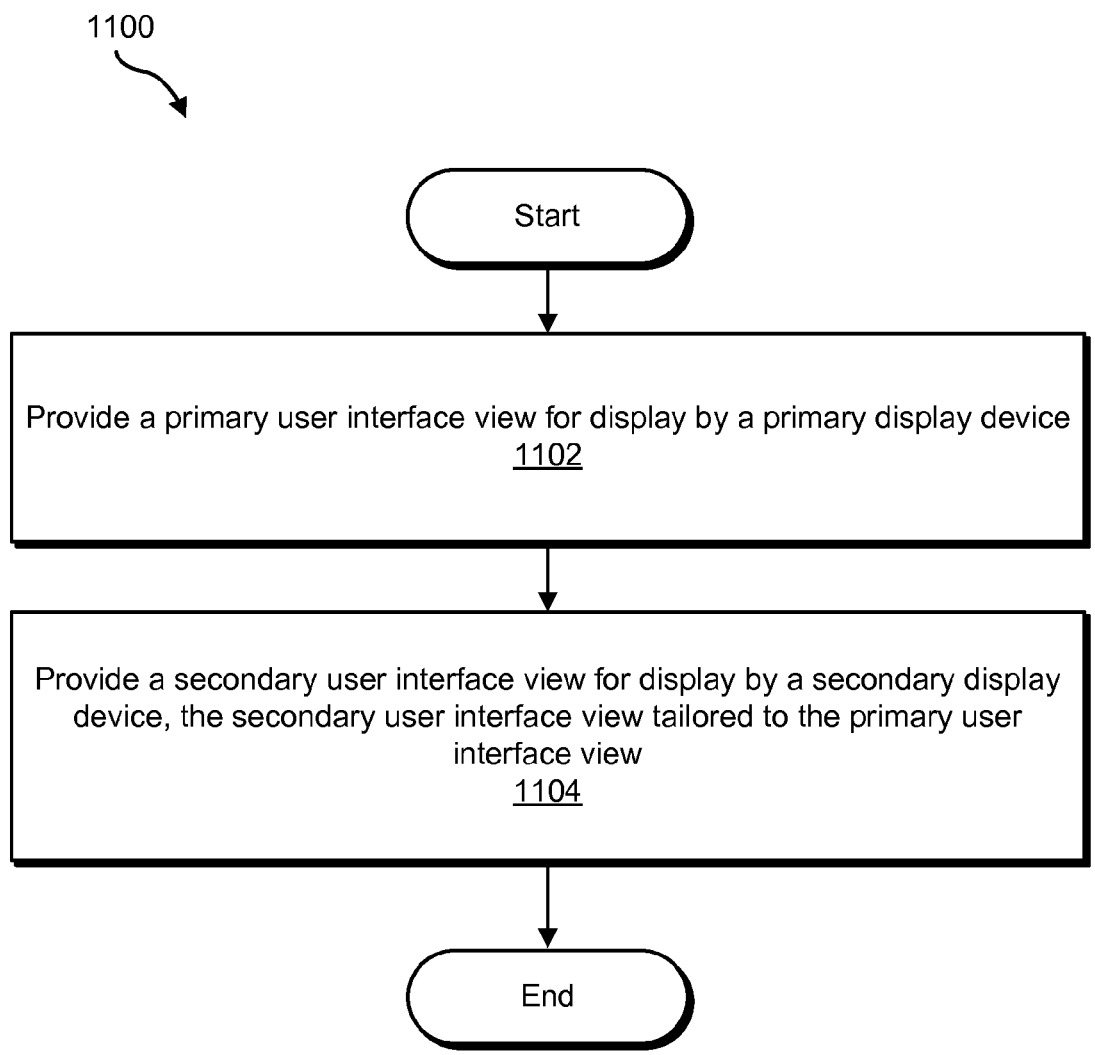
FIGS. 11-12 illustrate exemplary media service user interface methods according to principles described herein.
Figure 12:
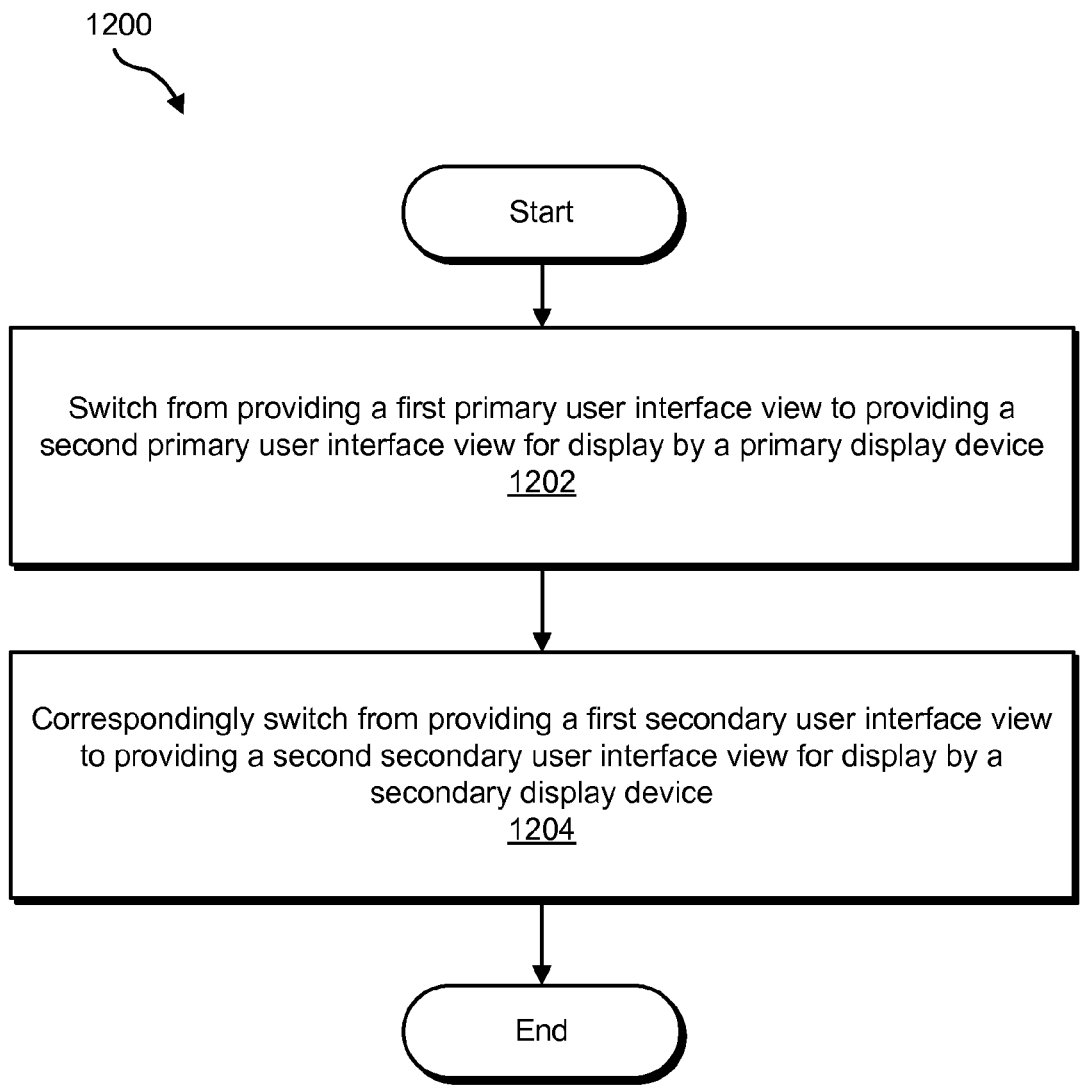

FIGS. 11-12 illustrate exemplary media service user interface methods 1100-1200 according to principles described herein. While FIGS. 11-12 illustrate exemplary steps according to certain embodiments, other embodiments may omit, add to, reorder, combine, and/or modify any of the steps shown in FIGS. 11-12. In certain embodiments, one or more of the steps shown in FIGS. 11-12 may be performed by system 100 and/or one or more components or implementations of system 100, such as by a computing device implementing system 100.

In step 1102 of method 1100, a media service user interface system (e.g., system 100) provides a primary user interface view for display by a primary display device, such as described herein.

In step 1104, the media service user interface system provides a secondary user interface view for display by a secondary display device, such as described herein. The secondary user interface view may be tailored to the primary user interface view in any of the ways described herein. For example, the secondary user interface view may be dynamically tailored to facilitate remote user interaction with the primary user interface view.

In step 1202 of method 1200, a media service user interface system (e.g., system 100) switches from providing a first primary user interface view to providing a second primary user interface view for display by a primary display device. Step 1202 may be performed in any of the ways described herein and may be performed in response to specific user input in certain examples.

In step 1204, the media service user interface system correspondingly switches from providing a first secondary user interface view to providing a second secondary user interface view for display by a secondary display device. Step 1202 may be performed in any of the ways described herein and may be performed in correspondence with the switching performed in step 1202 in certain examples.

Methods 1100-1200, or one or more steps of method 1100 or 1200, may be repeated to provide additional user interface views for display and/or for additional switching between user interface views for display.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a physical computer processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 13:
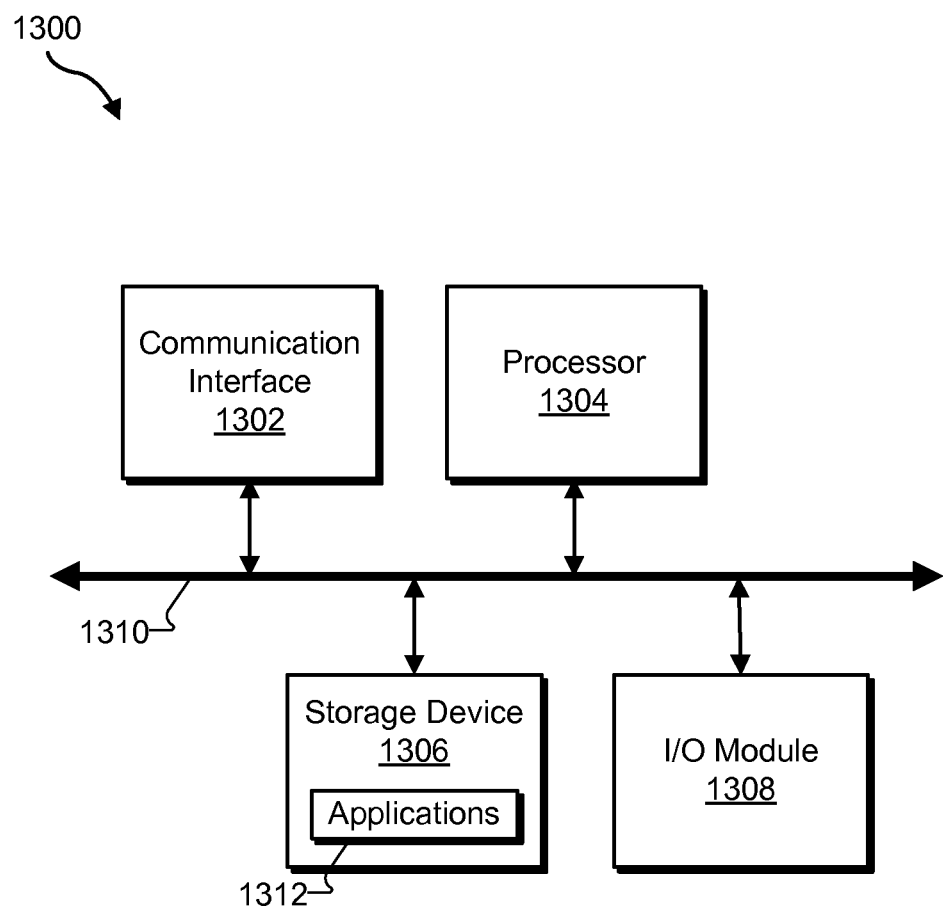
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a communications medium interface, a modem, and any other suitable interface. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications configured to direct processor 1304 to perform any of the operations described herein may be stored within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1300. For example, one or more applications 1312 residing within storage device 1306 may be configured to direct processor 1304 to perform one or more processes or functions associated with primary facility 102 and/or secondary facility 104. Likewise, storage facility 106 may be implemented by or within storage device 1306. In such implementations, system 100 may be referred to as a computer-implemented system 100.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
providing, by a media service user interface system for display on a display screen of a primary display device, a media menu tray user interface view that includes a media menu tray including a set of one or more user-selectable graphical objects representing a menu of one or more media programs;
determining, by the media service user interface system, a set of categories of media programs associated with the media menu tray;
representing, by the media service user interface system in the media menu tray included within the media menu tray user interface view, one category of media programs at a time from the set of categories of media programs;
detecting, by the media service user interface system, that a selector object is positioned, within the media menu tray, to highlight a user-selectable graphical object that is included in the set of one or more user-selectable graphical objects and that represents a media program included in the menu of one or more media programs;
determining, by the media service user interface system, a playback status of the media program represented by the highlighted user-selectable graphical object; and
providing, by the media service user interface system for display on a display screen of a mobile device while the media menu tray user interface view is provided for display on the display screen of the primary display device and while the one category of media programs at a time is represented in the media menu tray, a remote control user interface view dynamically tailored to facilitate remote user interaction with the media menu tray by
providing, within the remote control user interface view and not within the media menu tray user interface view, a set of media program category options configured to facilitate a user selection, from the set of categories of media programs, of the one category of media programs at a time that is represented in the media menu tray, and displaying options to initiate playback of the media program based on the playback status of the media program, the options to initiate playback including:
  only a direct playback option if the playback status of the media program indicates that consumption of the media program has not yet started, and
  both a direct playback option and a resume playback option if the playback status of the media program indicates that the media program has been partially consumed.

2. The method of claim 1, wherein the remote control user interface view is further dynamically tailored to facilitate remote user interaction with the media menu tray by:
  determining a current state of the media menu tray user interface view; and
  selecting user interface content for inclusion in the remote control user interface view based on the current state of the media menu tray user interface view.

3. The method of claim 1, wherein the remote control user interface view is further dynamically tailored to facilitate remote user interaction with the media menu tray by:
  selecting the set of media program category options to be provided within the remote control user interface view based on the set of categories of media programs associated with the media menu tray.

4. The method of claim 1, further comprising:
  detecting, by the media service user interface system, a user selection of a media program category option included in the set of media program category options in the remote control user interface view; and
  toggling, by the media service user interface system in response to the detecting of the user selection of the media program category option, from representing a first media program category in the media menu tray to representing a second media program category in the media menu tray.

5. The method of claim 1, wherein each media program category included in the plurality of media program categories is associated with a different media distribution platform.

6. The method of claim 1, wherein the plurality of media program categories comprises two or more of:
  a media program category representing scheduled-type media programs distributed in accordance with a media-provider-defined media program distribution schedule;
  a media program category representing recorded-type media programs accessible by way of a digital video recorder device; and
  a media program category representing on-demand type media programs accessible on-demand.

7. The method of claim 1, wherein:
  the media menu tray represents a category of scheduled-type media programs distributed in accordance with a media-provider-defined media program distribution schedule; and
  the one or more media programs represented in the menu of one or more media programs comprise at least one of
    a media program currently being distributed in accordance with the media-provider-defined media program distribution schedule,
    a media program about to be distributed in accordance with the media-provider-defined media program distribution schedule, and
    a media program recently distributed in accordance with the media-provider-defined media program distribution schedule.

8. The method of claim 1, wherein the remote control user interface view comprises an option configured to be selected by a user to hide the media menu tray from being displayed on the display screen of the primary display device.

9. The method of claim 1, further comprising:
  detecting, by the media service user interface system, a user request to hide the media menu tray from being displayed on the display screen of the primary display device; and
  in response to the detecting of the user request to hide the media menu tray,
    switching, by the media service user interface system, from the providing of the media menu tray user interface view for display on the display screen of the primary display device to providing a main content view for display on the display screen of the primary display device, and
    switching, by the media service user interface system, from the providing of the remote control interface view dynamically tailored to facilitate remote user interaction with the media menu tray for display on the display screen of the mobile display device to providing another remote control interface view tailored to facilitate remote user interaction with the main content view for display on the display screen of the mobile device.

10. The method of claim 1,
  wherein the remote control user interface further includes a set of user-selectable options that form a virtual directional pad including a plurality of arrows configured to facilitate the user in navigating the selector object to select from the set of the one or more user-selectable graphical objects; and
  further comprising:
    detecting, by the media service user interface system, a contextual position of the selector object within the media menu tray, the selector object navigable by a user to select from the set of the one or more user-selectable graphical objects,
    determining, by the media service user interface system based on the detected contextual position of the selector object within the media menu tray, that movement of the selector object in a particular direction is not available, and
    visually indicating, by the media service user interface system on the virtual directional pad based on the determining that the movement of the selector object in the particular direction is not available, a deactivation of a particular arrow within the plurality of arrows included within the virtual directional pad, the particular arrow corresponding to the particular direction.

11. The method of claim 10, wherein the remote control user interface view is further dynamically tailored to facilitate remote user interaction with the media menu tray by:
  deactivating the particular arrow within the plurality of arrows included within the virtual directional pad based on the determining that the movement of the selector object in a particular direction is not available.

12. The method of claim 10, further comprising:
  detecting, by the media service user interface system subsequent to the visually indicating of the deactivation of the particular arrow, a second contextual position of the selector object within the media menu tray;

determining, by the media service user interface system based on the detected second contextual position of the selector object within the media menu tray, that movement of the selector object in the particular direction is available;

dynamically updating, by the media service user interface system based on the determining that movement of the selector object in the particular direction is available, the remote control user interface to visually indicate a reactivation of the particular arrow within the plurality of arrows included within the virtual directional pad.

13. The method of claim 1, embodied as computer-executable instructions on at least one non-transitory computer-readable medium.

14. A method comprising:

switching, by a media service user interface system, from providing a full-screen video playback view for display on a display screen of a primary display device to providing a media menu tray user interface view for display on the display screen of the primary display device, the media menu tray user interface view comprising a partial-screen video playback on a first portion of the display screen of the primary display device, and a media menu tray displayed on a second portion of the display screen of the primary display device, the media menu tray including a set of one or more user-selectable graphical objects representing a menu of one or more media programs; and correspondingly switching, by the media service user interface system, from providing a first remote control interface view tailored to facilitate remote user interaction with the full-screen video playback view for display on a display screen of a mobile device to providing a second remote control interface view tailored to facilitate remote user interaction with the media menu tray of the media menu tray user interface view for display on the display screen of the mobile device;

determining, by the media service user interface system, a set of categories of media programs associated with the media menu tray;

representing, by the media service user interface system in the media menu tray included within the media menu tray user interface view, one category of media programs at a time from the set of categories of media programs;

detecting, by the media service user interface system, that a selector object is positioned, within the media menu tray, to highlight a user-selectable graphical object that is included in the set of one or more user-selectable graphical objects and that represents a media program included in the menu of one or more media programs;

determining, by the media service user interface system, a playback status of the media program represented by the highlighted user-selectable graphical object;

providing, by the media service user interface system within the second remote control interface view and not within the media menu tray user interface view, a set of media program category options configured to facilitate a user selection, from the set of categories of media programs, of the one category of media programs at a time that is represented in the media menu tray; and displaying, by the media service user interface system, options to initiate playback of the media program based on the playback status of the media program, the options to initiate playback including:

only a direct playback option if the playback status of the media program indicates that consumption of the media program has not yet started, and both a direct playback option and a resume playback option if the playback status of the media program indicates that the media program has been partially consumed.

15. The method of claim 14, further comprising:

detecting, by the media service user interface system while the full-screen video playback view is displayed on the display screen of the primary display device, a user request to launch the media menu tray for display on the display screen of the primary display device;

wherein the switching from the providing the full-screen video playback view for display on the display screen of the primary display device to the providing of the media menu tray user interface view for display on the display screen of the primary display device is performed in response to the user request; and wherein the correspondingly switching from the providing of the first remote control interface view for display on the display screen of the mobile device to the providing of the second remote control interface view for display on the display screen of the mobile device is performed in response to the user request.

16. The method of claim 15, wherein the user request comprises a user selection, within the first remote control interface view, of an option to launch the media menu tray for display on the display screen of the primary display device.

17. The method of claim 14, further comprising:

detecting, by the media service user interface system while the media menu tray user interface view is displayed on the display screen of the primary display device, a user request to hide the media menu tray from being displayed on the display screen of the primary display device;

switching, by the media service user interface system, from the providing of the media menu tray user interface view for display on the display screen of the primary display device to providing the full-screen video playback view for display on the display screen of the primary display device in response to the user request; and correspondingly switching, by the media service user interface system, from the providing of the second remote control interface view for display on the display screen of the mobile display device to providing the first remote control interface view for display on the display screen of the mobile device in response to the user request.

18. The method of claim 14, embodied as computer-executable instructions on at least one non-transitory computer-readable medium.

19. A system comprising:

at least one physical computing device that:

provides, for display on a display screen of a primary display device, a media menu tray user interface view that includes main user interface content displayed on a first portion of the display screen of the primary display device, and a media menu tray displayed on a second portion of the display screen of the primary display device, the media menu tray including a set of one or more user-selectable graphical objects representing a menu of one or more media programs;

determines a set of categories of media programs associated with the media menu tray;
represents, in the media menu tray included within the media menu tray user interface view, one category of media programs at a time from the set of categories of media programs;
detects that a selector object is positioned, within the media menu tray, to highlight a user-selectable graphical object that is included in the set of one or more user-selectable graphical objects and that represents a media program included in the menu of one or more media programs;
determines a playback status of the media program represented by the highlighted user-selectable graphical object; and
provides, for display on a display screen of a mobile device while the media menu tray user interface view is provided for display on the display screen of the primary display device and while the one category of media programs at a time is represented in the media menu tray, a remote control user interface view dynamically tailored to facilitate remote user interaction with the media menu tray by
providing, within the remote control user interface view and not within the media menu tray user interface view, a set of media program category options configured to facilitate a user selection, from the set of categories of media programs, of the one category of media programs at a time that is represented in the media menu tray, and
displaying options to initiate playback of the media program based on the playback status of the media program, the options to initiate playback including:
only a direct playback option if the playback status of the media program indicates that consumption of the media program has not yet started, and
both a direct playback option and a resume playback option if the playback status of the media program indicates that the media program has been partially consumed.

20. The system of claim 19,
wherein the remote control user interface further includes a set of user-selectable options that form a virtual directional pad including a plurality of arrows configured to facilitate the user in navigating the selector object to select from the set of the one or more user-selectable graphical objects; and
the at least one physical computing device further
detects a contextual position of the selector object within the media menu tray, the selector object navigable by a user to select from the set of the one or more user-selectable graphical objects,
determines, based on the detected contextual position of the selector object within the media menu tray, that movement of the selector object in a particular direction is not available, and
visually indicates, on the virtual directional pad based on the determination that the movement of the selector object in the particular direction is not available, a deactivation of a particular arrow within the plurality of arrows included within the virtual directional pad, the particular arrow corresponding to the particular direction.

21. The system of claim 20, wherein the at least one physical computing device further:
detects, subsequent to the visual indication of the deactivation of the particular arrow, a second contextual position of the selector object within the media menu tray;
determines, based on the detected second contextual position of the selector object within the media menu tray, that movement of the selector object in the particular direction is available;
dynamically updates, based on the determination that movement of the selector object in the particular direction is available, the remote control user interface to visually indicate a reactivation of the particular arrow within the plurality of arrows included within the virtual directional pad.

* * * * *